(12) United States Patent
Radley-Smith

(10) Patent No.: US 7,209,114 B2
(45) Date of Patent: Apr. 24, 2007

(54) BRACELET WITH INFORMATION DISPLAY AND IMPUTTING CAPABILITY

(76) Inventor: Philip J. Radley-Smith, Newcroft Cottages, Selsfield Road, Ardingly, West Sussex, PH17 6TJ (GB)

( * ) Notice: Subject to any disclaimer, the term of this patent is extended or adjusted under 35 U.S.C. 154(b) by 522 days.

(21) Appl. No.: 10/220,130

(22) PCT Filed: Feb. 28, 2001

(86) PCT No.: PCT/GB01/00864

§ 371 (c)(1),
(2), (4) Date: Aug. 28, 2002

(87) PCT Pub. No.: WO01/64070

PCT Pub. Date: Sep. 7, 2001

(65) Prior Publication Data

US 2003/0030595 A1   Feb. 13, 2003

(30) Foreign Application Priority Data

Feb. 28, 2000 (GB) ................................. 0004688.8

(51) Int. Cl.
*G09G 5/00* (2006.01)
(52) U.S. Cl. ...................... 345/156; 345/168; 345/169; 345/173; 345/8
(58) Field of Classification Search ............... 368/30, 368/67, 82, 223–242, 282; 345/156–167, 345/173, 168, 169
See application file for complete search history.

(56) References Cited

U.S. PATENT DOCUMENTS

| 4,141,074 | A | | 2/1979 | Popper |
| 4,847,818 | A | * | 7/1989 | Olsen ........................ 368/10 |
| 5,214,623 | A | | 5/1993 | Seager |
| 5,251,189 | A | * | 10/1993 | Thorp ........................... 368/4 |
| 5,260,915 | A | | 11/1993 | Houlihan |
| 5,416,730 | A | * | 5/1995 | Lookofsky .................. 361/680 |
| 5,757,731 | A | * | 5/1998 | Rosenberg .................. 368/242 |
| 6,035,035 | A | * | 3/2000 | Firooz ..................... 379/433.1 |
| 6,158,884 | A | * | 12/2000 | Lebby et al. ............... 368/282 |
| 6,192,253 | B1 | * | 2/2001 | Charlier et al. .......... 455/575.7 |

(Continued)

FOREIGN PATENT DOCUMENTS

DE   35 08 365   12/1985

(Continued)

OTHER PUBLICATIONS

European Standard Search Report issued in a corresponding European application No. RS 105267, dated Oct. 3, 2000, 2 pages.

*Primary Examiner*—Richard Hjerpe
*Assistant Examiner*—Jennifer T Nguyen
(74) *Attorney, Agent, or Firm*—Nixon & Vanderhye P.C.

(57) ABSTRACT

A bracelet with information display and inputting capability comprises twelve segments hinged together to allow the bracelet to be folded around the wrist of a user. An information processing unit receives inputted information from an inputting device, for example, by a QWERTY keyboard, and generates display for displaying information on display screen. The display screen and the keyboard each extends over more than one segment of the bracelet, and the segments of the bracelet are hinged to allow the bracelet to be arranged flat for input of information via the inputting device.

65 Claims, 12 Drawing Sheets

U.S. PATENT DOCUMENTS 6,216,490 B1 * 4/2001 Radley-Smith .................. 63/3

FOREIGN PATENT DOCUMENTS

| DE | 3446148 A1 * | 6/1986 |
| DE | 38 13 409 | 11/1989 |
| DE | 299 12 001 U | 12/1999 |
| FR | 2 360 114 | 6/1976 |
| FR | 2 599 867 | 12/1987 |
| JP | 03197197 A * | 8/1991 |
| WO | WO 96/21888 | 7/1996 |

* cited by examiner

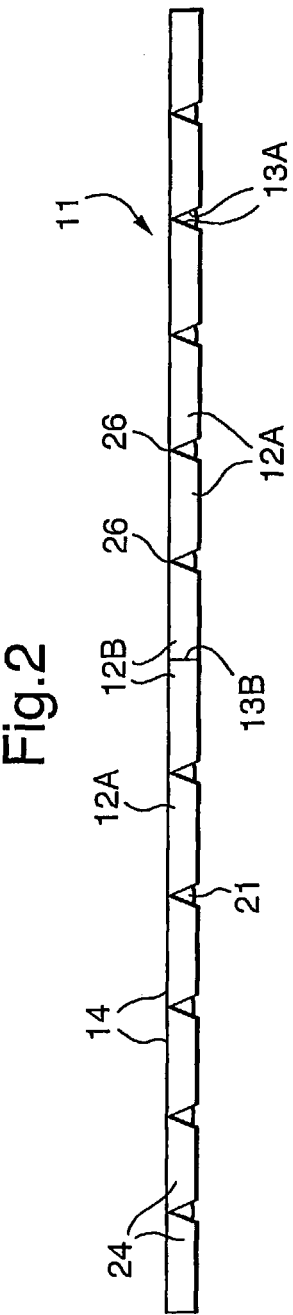
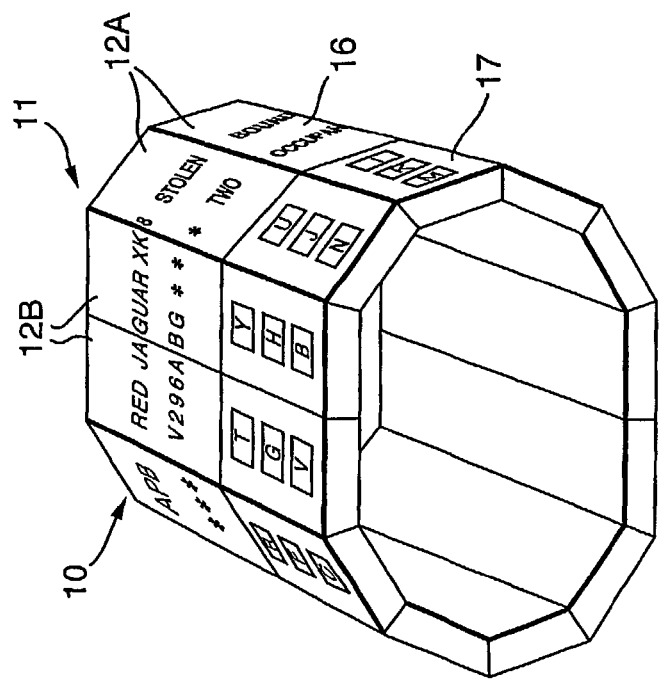

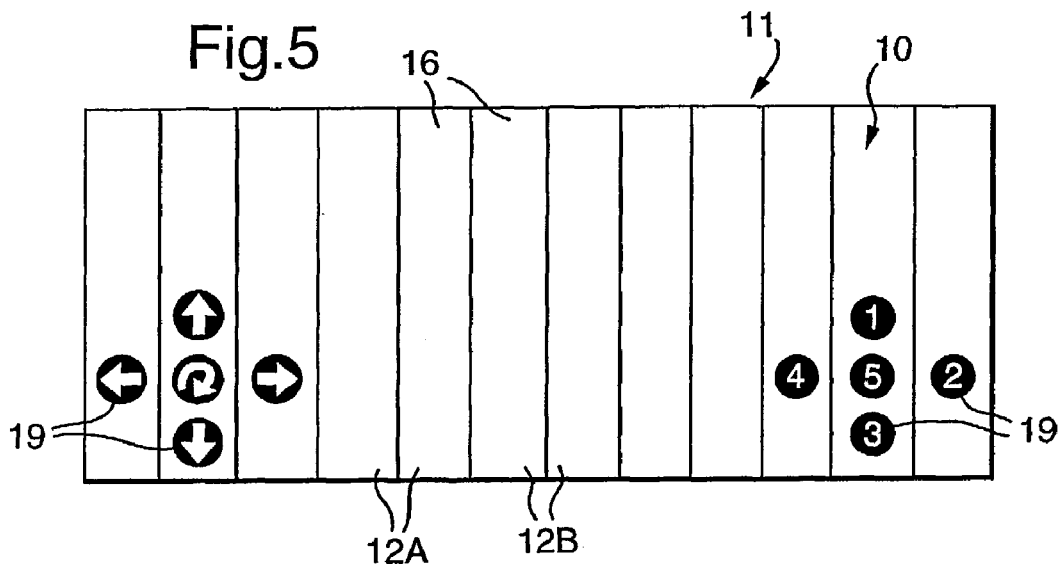
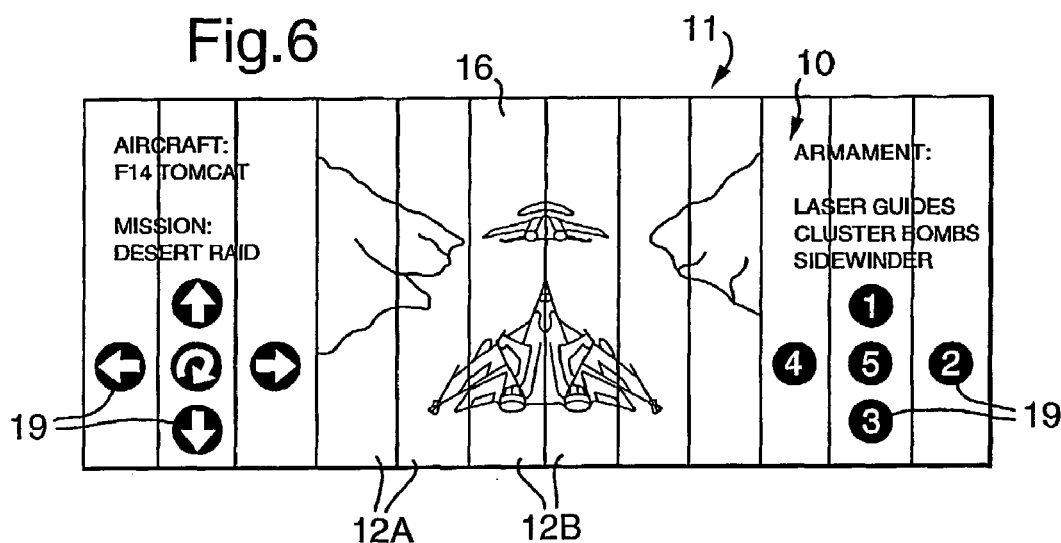
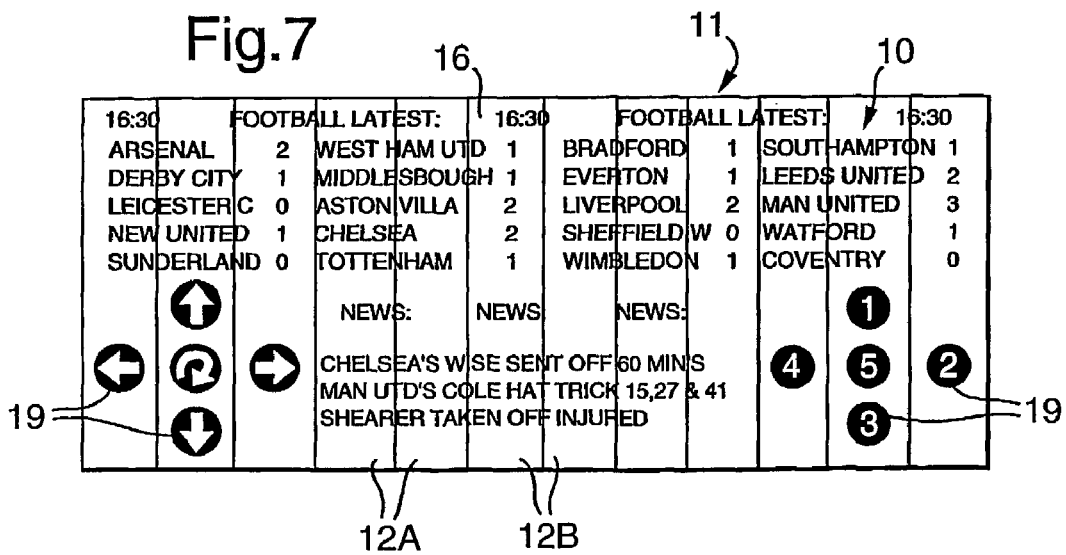

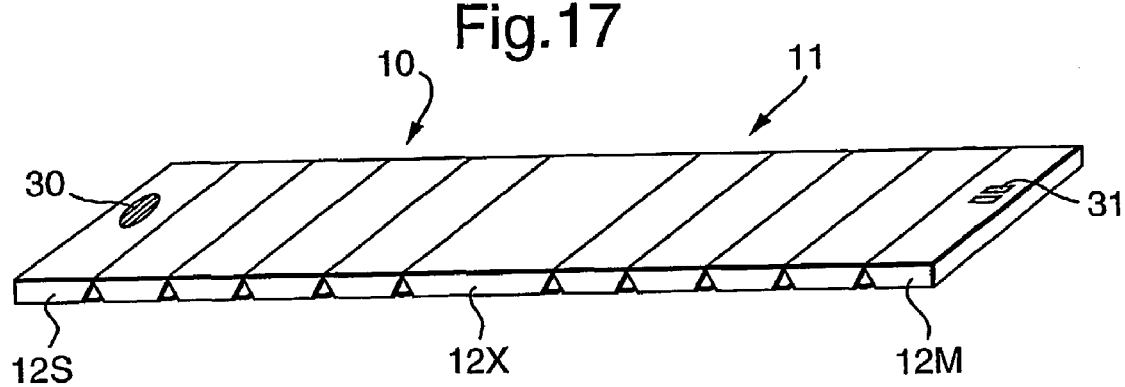
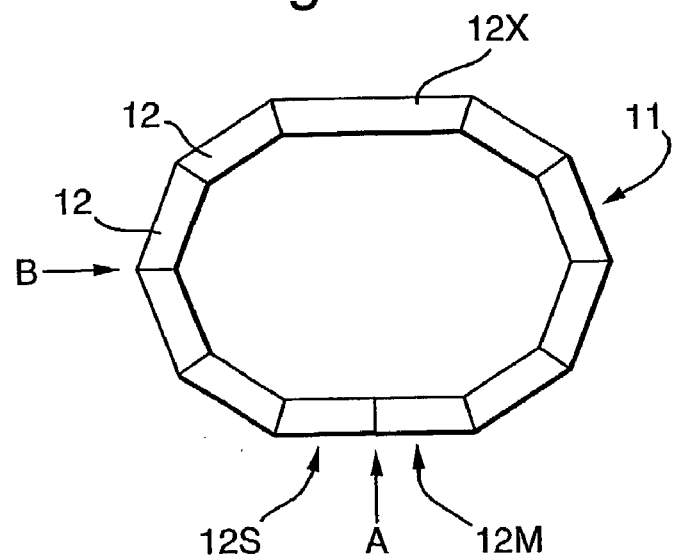

BRACELET WITH INFORMATION DISPLAY AND IMPUTTING CAPABILITY

This application is the National Phase of International Application PCT/GB01/00864 filed 28 Feb. 2001 which designated the U.S. and that International Application was published under PCT Article 21(2) in English. This application also claims priority to Great Britain Application No. GB 004688.8, filed 28 Feb. 2000, which document is herein incorporated by reference.

The present invention relates to a bracelet with information display and inputting capability.

Developments in personal information storage and transfer devices such as palm top computers, personal organisers, pagers and mobile telephones, have made possible the use of computer facilities in very small easily transportable electronic devices. Much attention has been given to suitable ways of carrying such devices, and to the operation of the devices conveniently by manual input of information through a keyboard, or by stylus and touch sensitive screen. Much attention has also been given to providing a portable personal connection to the Internet. The present invention addresses the need for easy transportation and storage of such a device, and a convenient configuration for input of information and the display of information.

Present day technology can easily provide computing functions in miniaturised components such that all required communications and data storage functions can be provided in easily portable equipment. The limit on size is imposed by two functions, namely the display of information to the user, and the input of information to the processing unit. The conflicting requirements of a screen large enough to be easily viewed, and an input device large enough to be easily operated by human fingers, on the one hand, and the desire to have a small easily portable device to be ever present and ever available for use, have not yet been reconciled. This is apparent because of the wide variety of solutions which are at present being marketed, such as personal organisers, multi-function mobile telephones, and wrist watches having functions additional to time keeping. Within these classes, there are numerous variations. Some personal organisers have a fixed configuration in which a wallet sized device has a display screen and input device on a single face. Other personal organisers have top and bottom shells hinged along one side which open to provide usually a screen on the inner side of one shell, and a keyboard on the inner side of the other shell. Typically the fixed configuration organisers have a portrait configuration for the display screen and the hinged shell organisers have a landscape configuration for the display screen. Similarly, there are numerous forms of mobile telephone available, some of which combine computing functions with telephone communication functions, some of which have hinged folding components and some of which are of unitary construction. Again, there are numerous forms of wrist watches with different types of display and different types of input keyboards, although at present there is no generally available wrist watch with a QWERTY keyboard.

Turning from commercially available products to the known art of experimental proposals, there are many patents and other disclosures of different combinations of screen and input device which may be used on different carrier members. There are large numbers of combinations of mobile telephones, folding keyboards, wrist mounted calculators, and variations in presentation of a personal organiser.

The significance of this wide range of prior art devices, commercially available or theoretically proposed, is to show that no totally satisfactory solution has yet been proposed. Computing devices have been combined with almost every other kind of implement, and proposals have even been made for computers to form part of the users clothing. There is a need for a simple easily transportable computing device which has a clear display area and an easily operated information input area.

In WO 96/21888, having the same inventor as the present invention, there is disclosed a bracelet having at least one electronic display unit arranged to display information in a sequence extending along substantially the full length of the bracelet, and control means provided to control the display unit or units so that the information displayed appears to move along the length of the bracelet with time. The bracelet can display a message formed from alphabetical or alphabetical and numerical characters, and can include memory means for storing a plurality of messages for display. It is disclosed that messages could be pre-programmed into a controlling integrated circuit in the bracelet, or alternatively the bracelet could be programmed by the user by downloading information from an electronic personal organiser or personal computer into the memory of the bracelet. The bracelet may include a receiver for receiving data transmitted for example by radio waves, and may display the time and alarm functions of a watch.

It is also known to provide a conventional wrist watch which provides other functions concerned with information transfer. For example in U.S. Pat. No. 5,260,915 (Houlihan) there is disclosed a combined wrist watch and radio telephone having a plurality of substantially rigid segment members arranged end to end in a series of pivotal connections between each adjacent pair of members in the series. The pivotal axes of these connections are substantially parallel to the longitudinal axis of the users wrist when the apparatus is worn on the wrist as a wrist watch. The pivotable connections allow the apparatus to be curved into a shape which fits around the users wrist when the apparatus is to be used as a wrist watch. Alternatively, the pivotable connections allow the apparatus to form a more elongated structure suitable for use as a hand-held radio telephone when such use is desired. One segment of the wrist watch includes a display screen which can be used to display the time, a telephone number, and/or other message information. This segment member also includes telephone dialling push-buttons and additional push buttons for controlling the time keeping and radio telephone functions of the apparatus. However, because of the shape of the wrist watch, and its use as a radio telephone, it is not possible to open the segments to allow the wrist watch to be laid flat.

In U.S. Pat. No. 4,141,074 (Popper) there is disclosed a wrist calculator consisting of a calculator and a wrist watch combined together. The wrist calculator includes a wrist case having opposed faces and opposite ends, and a wrist band coupled to respective ends of the wrist case and forming a closed loop. Electronic calculator means are carried by the case which further has an electrical optical display means within one face thereof for optically displaying data during calculator use. The wrist calculator further includes a calculator keyboard. It is a principle object of the disclosure to provide a wrist calculator or combined wrist watch and wrist calculator in which the keyboard permits easy and comfortable operation. The wrist band may be separated to facilitate access to the keyboard defined by the wrist band and to facilitate keyboard operation after removal of the wrist calculator from the wrist of the user. A detachable coupling may be incorporated between a given pair of links for permitting the watch band to be separated into two portions facilitating the placement of the wrist calculator and wrist band face up on a horizontal surface for facilitating calculator use.

In DE-A-3,508,365 (Weise) there is disclosed a watch with a bracelet consisting of several segments and with keys for operation of at least one additional function unit located within one segment of the bracelet. The keys are intended to be positioned on at least one of the segments of the bracelet. It is said that by positioning the keys away from the watch body and onto the members of the bracelet it is possible to configure the keys larger than is possible in usual arrangements on the watch body. In one example a calculator is provided in one of the segments next to the watch body.

In FR-2A-2360114 (Magri) there is disclosed an electronic bracelet watch with a system for entering digital data, in particular a bracelet watch combined with an electronic calculator. It is proposed to distribute the electronic components over at least a part of the bracelet, so as to obtain keys that are big enough and far enough apart to allow them to be used without the need for a special tool, which is said to be necessary in previous watches of the type described. The bracelet is formed by a succession of segments, and over a part of the bracelet each segment accommodates two keys. The keys are used to enters numbers 0 to 9 and controls for the four standard operations of addition, subtraction, multiplication and division.

In U.S. Pat. No. 5,416,730 (Lookofsky) there is disclosed a portable computer having a frame with a central portion and two end portions. One of the end portions is hingedly mounted to the central portion and a central processing unit (CPU) is associated with the central frame portion. A power module is removably mounted on the frame in communication with the CPU. A keyboard module is removably mounted on one end portion in communication with the CPU, and a screen is removably mounted on the other end portion in communication with the CPU. The frame has fastening mechanism for adjustably securing the frame around a user's arm substantially to prevent longitudinal and rotational movement of the frame, the hinged end portion carrying the keyboard having a locking mechanism for maintaining the keyboard at a predetermined angle with respect to the CPU. It is said that there is provided a computer configuration for data collection or information processing which by design frees both hands for other tasks. The computer is designed to be wearable on the arm on which it is fitted onto a tight fitting inner glove or strap arrangement and is subsequently closed about the arm with self-locking hinges.

In DE-A-3 813 409 (Osterhage) there is disclosed a wrist watch with a multi-digital display, consisting of a continuous chain of individual bracelet links, each bracelet link being constructed as a digital display, controlled by a piezoelectric control circuit which provides a multi-digit display which is pulsed from bracelet link to bracelet link so that the digital display pulses in time around the bracelet.

Other devices disclosed in the prior art are described in: DE-29912001 (Kreisz); FR-A-2,599,867 (Gennari); U.S. Pat. No. 5,214,623 (Seager); and U.S. Pat. No. 5,251,189 (Timex Corporation).

It is an object of the present invention to provide an improved bracelet with information display and inputting capability allowing better display of information, and more convenient information input capability.

According to the present invention in one aspect there is provided a bracelet with information display and inputting capability, comprising: a plurality of four or more segments hinged together to allow the bracelet to be folded around the wrist of a user; an information processing unit for receiving inputted information and for generating display signals for displaying information; a display device for displaying information derived from the information processing unit; and an information inputting device for inputting information to the information processing unit by manual interaction with the inputting device; the outer surface of the bracelet having an information exchange area comprising the area occupied by the display device and the area occupied by the inputting device in combination, the information exchange area extending over more than one segment of the bracelet, the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device, in which the bracelet includes coupling components for coupling the segments together in such a manner as to maintain the bracelet at least substantially fixed in the flat configuration during normal inputting of information.

According to the present invention in another aspect there is provided a bracelet with information display and inputting capability, comprising: a plurality of four or more segments hinged together to allow the bracelet to be folded around the wrist of a user; an information processing unit for receiving inputted information and for generating display signals for displaying information; a display device for displaying information derived from the information processing unit; and an information inputting device for inputting information to the information processing unit by manual interaction with the inputting device; the outer surface of the bracelet having an information exchange area comprising the area occupied by the display device and the area occupied by the inputting device in combination, the information exchange area extending over more than one segment of the bracelet, the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device, in which the information exchange area has a width in a direction transverse to the length of the bracelet which is equal to at least 10% of the length of the bracelet.

According to the present invention in a further aspect there is provided a bracelet with information display and inputting capability, comprising: a plurality of four or more segments hinged together to allow the bracelet to be folded around the wrist of a user; an information processing unit for receiving inputted information and for generating display signals for displaying information; a display device for displaying information derived from the information processing unit; and an information inputting device for inputting information to the information processing unit by manual interaction with the inputting device; the outer surface of the bracelet having an information exchange area comprising the area occupied by the display device and the area occupied by the inputting device in combination, the information exchange area extending over more than one segment of the bracelet, the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device, in which the information exchange area is elongate in the direction of the length of the bracelet, and the information inputting device comprises an array of manually operable key regions representing respectively the letters of an alphabet, the array of key regions being aligned along the length of the bracelet.

According to the present invention in a yet further aspect there is provided a bracelet with information display and inputting capability, comprising: a plurality of four or more segments hinged together to allow the bracelet to be folded around the wrist of a user; an information processing unit for receiving inputted information and for generating display signals for displaying information; a display device for displaying information derived from the information processing unit; and an information inputting device for inputting information to the information processing unit by manual interaction with the inputting device; the outer surface of the bracelet having an information exchange area comprising the area occupied by the display device and the area occupied by the inputting device in combination, the information exchange area extending over more than one segment of the bracelet, the segments of the bracelet being hinged to allow movement of the segments between a first, wrist-worn, configuration in which the bracelet can be folded around the wrist of a user, and a second, flat, configuration, in which the bracelet can be arranged flat for input of information via the inputting device, in which the information exchange area is elongate in the direction of the length of the bracelet and the information inputting device comprises an array of manually operable key regions representing respectively the letters of an alphabet, the array of key regions being aligned across the length of the bracelet.

The aspects of the invention set out above may be utilised in combination or independently. For example although it is preferred that the bracelet is fixed or substantially fixed when flat, this is not essential in other aspects of the invention. In other aspects of the invention the segments of the bracelet may be loosely linked together when in the flat configuration, the bracelet being supported on a flat horizontal surface when in the flat configuration. However, as has been mentioned, it is preferred that the bracelet is fixed or substantially fixed when in the flat configuration.

Conveniently the arrangement may be such that information can also be inputted when the apparatus is worn on the wrist of the user, but it is a particular advantage of the invention in the first aspect set out above that input of information can be made more conveniently when the bracelet is removed from the wrist, and laid out flat, for example on a desk or other flat surface, or cantilevered in the hand.

It is to be appreciated that the bracelet may be arranged to be secured to the wrist by virtue of encircling the wrist completely, in the first configuration, or alternatively the bracelet may be arranged to be secured to the wrist by gripping the wrist by the action of the segments, in the latter case it not being necessary for the bracelet to encircle the wrist completely. In the latter case, it is preferred that the segments extend around a path subtending an angle greater than 280°, preferably subtending an angle greater than 330°. It is preferred that the bracelet comprises at least five segments, more preferably at least seven segments, and in a particularly preferred form the bracelet comprises eleven segments. In some arrangement the bracelet consists mainly of segments, but some parts of the bracelet are composed of other elements, for example elasticated elements. However it is preferred that the bracelet is formed entirely by the segments.

In one particularly preferred form, the display device extends over two or more segments of the bracelet, and is arranged to provide a visual image composed of individually energisable display elements. These may for example be pixels of a television type display, or may be segments of alpha numeric characters, or may be any known form of display formed by a dot matrix.

In another particularly preferred form, the display device extends over at least two segments of the bracelet, at least some adjacent segments of the display device being visually associated with each other so as to present a unified display of information extending over the associated segments. For example the segments may be visually associated so that an alpha numeric text runs from one segment to the other while remaining a coherent text. In other arrangements adjacent visually associated segments may provide a visual picture in which the segments join coherently to provide a single unified picture.

In some arrangements, the coupling components comprise stiff hinges having sufficient stiffness to maintain the bracelet substantially fixed in the flat configuration during normal inputting of information. It may be arranged that the coupling components provide a greater extent of stiffness when the bracelet is in the second, flat, configuration, than when the bracelet is in the first, wrist-worn, configuration. Alternatively the coupling components have an extent of stiffness which is substantially the same when the bracelet is in the second flat configuration and in the first wrist-worn configuration, the extent of stiffness being selected such as to maintain the bracelet substantially fixed in the flat configuration during normal inputting of information, yet sufficiently movable to allow movement of the bracelet to the first wrist-worn configuration. In some preferred arrangements the coupling components include at least one locking mechanism operating between a pair of adjacent segments of the bracelet to releasably lock the adjacent segments into a substantially fixed relationship when flat, or into a completely fixed relationship. In a particularly preferred form, the locking mechanism is a detent mechanism which, in the first, flat, position, resiliently biases adjacent segments to the said fixed relationship but allows release for folding around the wrist, by manual movement against the resilient biasing. In other forms a locking mechanism such as a catch may be manually operated, to lock adjacent segments in a completely fixed relationship when flat.

Overall, it is particularly preferred that the bracelet is constructed and arranged in such a manner that in the flat configuration the bracelet is sufficiently rigid to prevent movement of the segments relative to each other when held in a cantilevered position by holding one third of the bracelet, or more preferably by holding only one quarter of the bracelet.

In one convenient form, it is arranged that adjacent segments of the bracelet have outer faces which substantially abut each other both when the bracelet is bent about the wrist of a user and when in the flat configuration, adjacent segments being hinged for pivotal movement about the line of abutment of adjacent outer faces of the adjacent segments.

It is particularly preferred that the information exchange area extends over a large proportion of the normally visible outer surface of the bracelet. Preferably, the information exchange area extends over at least 50% of the normally visible outer surface of the bracelet, more preferably over at least 75% of the normally visible outer surface of the bracelet. In some preferred arrangements the information exchange area extends over substantially the whole of the normally visible outer surface of the bracelet.

Preferably the display device extends over three or more segments of the bracelet. In some arrangements the display device extends over substantially the entire length of the bracelet, although in some arrangements the information inputting device may extend across the entire width of the bracelet, thus interrupting the extent of the display device. Preferably the information inputting device extends over three or more segments of the bracelet, in some arrangements over substantially the entire length of the bracelet.

It is particularly preferred that the information processing unit is arranged to generate display signals such that information displayed appears to move along the length of the bracelet with time. This gives the advantage that the information can be seen from a number of angles when the bracelet is worn on the wrist.

In some forms of the invention, the information inputting device can comprise an alpha numeric keyboard, that is to say a keyboard with keys representing alphabetic characters, and numerical characters.

In one form the keyboard is aligned along the length of the bracelet, and in such a case conveniently the keyboard occupies only part of the width of the bracelet, the remainder of the width being occupied by the display device. In such an arrangement, when the wrist watch is laid out flat for inputting purposes, it is possible to provide a much wider keyboard (along the length of the bracelet) to give convenient array of keys for inputting information. In one preferred form the keyboard has a plurality of columns of keys, one or more columns being positioned on adjacent segments of the bracelet. Conveniently the keyboard is a QWERTY type keyboard, the letter keys being laid out in ten columns positioned respectively on ten adjacent segments of the bracelet.

In other forms of the embodiments of the invention, the keyboard can be aligned across the length of the bracelet. Conveniently the keyboard has a plurality of rows of keys, one or more rows being positioned on adjacent segments of the bracelet. It may be arranged that the keyboard is a QWERTY type keyboard, the letter keys preferably being laid out in three rows positioned respectively on three adjacent segments of the bracelet.

In alternative forms of a bracelet embodying the invention, it may be arranged that the information inputting means comprises a touch sensitive screen allowing inputting of information, which may be by selection from menus. Alternatively, or in addition, it may be arranged that the information inputting means comprises a control means of an electronic game station.

It is particularly preferred that the construction of the bracelet is such that adjacent segments of the bracelet have outer faces which substantially abut each other both when the bracelet is bent about the wrist of a user and when laid out flat, adjacent segments being hinged for pivotal movement about the line of abutment of adjacent outer faces of the adjacent segments.

It is a particular feature of the invention that the information exchange area is wide in a direction transverse to the length of the bracelet. Preferably the information exchange area has a width in a direction transverse to the length of the bracelet which is at least 10% of the length of the bracelet, more preferably 20% and most preferably at least 30%. In other arrangements the information exchange area may have a width in a direction transverse to the length of the bracelet which is at least 40% of the length of the bracelet, or even 50% of the length of the bracelet.

Various shapes for the information exchange area may be provided, but it is preferred that the information exchange area is elongate in a direction along the length of the bracelet, preferably substantially rectangular.

It is another feature of the invention that the bracelet with information display and inputting capability is preferably substantially wider in a direction transverse to the length of the bracelet, than a normal wrist watch strap. Preferably the minimum width of the bracelet in a direction transverse to the length of the bracelet is equal to at least 10% of the length of the bracelet, and preferably the average width of the bracelet in a direction transverse to the length of the bracelet is equal to at least 10% of the length of the bracelet. Most preferably the minimum width, and/or average width, is equal to at least 20% of the length of the bracelet, more preferably at least 30%, and conveniently at least 40% or even 50%. Preferably the width of the bracelet in a direction transverse to the length of the bracelet is substantially constant.

Although preferred features have been described with reference to an alpha numeric keyboard, it is to be realised that such an alpha numeric keyboard need not be provided by individually movable physical keys. It is common practice in personal organisers to provide a touch sensitive screen, which may show a keyboard such as a QWERTY keyboard. In these arrangements there are provided an array of manually operable key regions representing the letters of the alphabet, the key regions being regions of the touch sensitive screen, which may be operated by touching the screen by the finger, or by a specially provided stylus. In preferred forms, key regions representing numbers are also included.

Thus in accordance with the present invention it is particularly preferred that the information exchange area is elongate in the direction of the length of the bracelet, and the information inputting device comprises an array of manually operable key regions representing respectively the letters of an alphabet, the array of key regions being aligned across the length of the bracelet. The key regions may be physically movable keys, or may be regions of a touch sensitive screen.

In another preferred arrangement the information exchange area is elongate in the direction of the length of the bracelet, and the information inputting device comprises an array of manually operable key regions representing respectively the letters of an alphabet, the array of key regions being aligned along the length of the bracelet.

In accordance with another feature of the present invention, the bracelet may be movable to a third configuration, for use of the bracelet as a mobile telephone. Thus in accordance with some preferred embodiments of the invention one segment of the bracelet forms a telephone ear piece and another segment of the bracelet forms a telephone mouth piece and the information processing unit includes a telephone transmitter and telephone receiver. The segments of the bracelet are hinged to allow movement to a third, telephone, configuration, in which the telephone ear piece and the telephone mouth piece are positioned in a normal telephone operating position relative to the ear and mouth of a user. In such arrangements it may be provided that the third telephone configuration the bracelet is shaped in an at least partly curved configuration having an overall curvature less than the curvature in the first wrist-worn configuration.

It is to be appreciated that where features of the invention are set out herein with regard to apparatus according to the invention, such features may also be provided with regard to a method according to the invention, and vice versa.

In particular there is provided in accordance with the invention method of operating a bracelet with information display and inputting capability, comprising: inputting information to an information processing unit mounted in a bracelet, by manual interaction with an inputting device mounted on the bracelet, the outer surface of the bracelet having an information exchange area comprising the area occupied by the display device and the area occupied by the inputting device in combination, the information exchange area extending over more than one segment of the bracelet; and displaying information derived from the information processing unit, on a display device on the bracelet, while the bracelet is worn on the wrist of a user, the bracelet comprising a plurality of segments hinged and coupled together to allow the bracelet to be folded around the wrist of a user; the method including the steps of: displaying information on the display device while the bracelet is worn on the wrist of a user; and inputting information into the information processing unit when the bracelet is arranged flat by the user, by manual interaction with the information inputting device.

It is particularly preferred in such a method that the method includes positioning the bracelet in the second, flat, configuration, in front of the user in a transverse orientation with the length of the bracelet extending across the field of view of the user, and inputting information by manual interaction with the inputting device in the said transverse orientation. Such a method finds particular application where the information exchange area is elongate in the direction of the length of the bracelet, and the information inputting device comprises an array of manually operable key regions representing respectively the letters of an alphabet, the array of key regions being aligned along the length of the bracelet.

It is another particularly preferred feature of the invention that the method may include the steps of removing the bracelet from the wrist and moving the segments of the bracelet to a flat configuration in which the segments are maintained substantially fixed relative to each other, and inputting information via the inputting device while holding the bracelet by only a portion of the length of the bracelet, the remainder of the bracelet being maintained fixed in the flat configuration. Yet another preferred feature of the invention is that the display device may extend over at least two segments, and the method may include moving at least two adjacent segments of the display device to a flat configuration in which the segments are visually associated with each other so as to present a unified display of information extending over the visually associated segments.

In accordance with a yet further aspect of the invention there may be provided a method of operating a bracelet with information display and inputting capability, comprising: inputting information to an information processing unit mounted in a bracelet, by manual interaction with an inputting device mounted on the bracelet; and displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user; the method including the steps of: displaying information on the display device while the bracelet is worn on the wrist of a user, and inputting information into the information processing unit when the bracelet is arranged flat by the user, by manual interaction with the information inputting device, the area occupied by the display device and the inputting device in combination extending over more than one segment of the bracelet; wherein the method includes positioning the bracelet in the second flat, configuration, in front of the user in a transverse orientation with the length of the bracelet extending across the field of view of the user, and inputting information by manual interaction with the inputting device in the said transverse orientation.

In accordance with a yet further preferred method of the invention there may be provided a method of operating a bracelet with information display and inputting capability, comprising: inputting information to an information processing unit mounted in a bracelet, by manual interaction with an inputting device mounted on the bracelet; and displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user; the method including the steps of: displaying information on the display device while the bracelet is worn on the wrist of a user; and inputting information into the information processing unit when the bracelet is arranged flat by the user, by manual interaction with the information inputting device, the area occupied by the display device and the inputting device in combination extending over more than one segment of the bracelet; in which the steps of removing the bracelet from the wrist and moving the segments of the bracelet to a flat configuration in which the segments are maintained substantially fixed relative to each other, and inputting information via the inputting device while holding the bracelet by only a portion of the length of the bracelet, the remainder of the bracelet being maintained at least substantially fixed in the flat configuration.

In a yet further aspect of the invention, there may be provided a method of operating a bracelet with information display and inputting capability, comprising: inputting information to an information processing unit mounted in a bracelet, by manual interaction with an inputting device mounted on the bracelet; and displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user; the method including the steps of: displaying information on the display device while the bracelet is worn on the wrist of a user; and inputting information into the information processing unit when the bracelet is arranged flat by the user, by manual interaction with the information inputting device, the area occupied by the display device and the inputting device in combination extending over more than one segment of the bracelet; in which the display device extends over at least two segments, and the method includes moving at least two adjacent segments of the display device to a flat configuration in which the segments are visually associated with each other so as to present a unified display of information extending over the visually associated segments.

It is to be appreciated that it is a significant advantage of the invention in these aspects, that the bracelet can be held, when in the flat configuration, in a cantilevered manner, without the segments of the bracelet moving relative to each other. Thus for example it is possible to hold the bracelet when in the flat configuration, in one hand, and to input information with the other hand, in the conventional manner of a personal digital organiser. Similarly, if required, the bracelet can be held in the flat configuration at a position around the centre of the bracelet, without the distal ends moving. This gives much greater convenience when inputting information, than would be the case if the bracelet had loose segments, and had to be supported by a horizontal surface before information could be inputted.

Embodiments of the invention provide a number of advantages. An information bracelet embodying the invention can be worn around the wrist for transportation and general viewing, but can be programmed whilst in a flat rigid shape, such as is conventional for a normal keyboard. The hinges can be such as to lock when folded out flat to provide a rigid platform, or can merely have the capability of laying out flat, relying upon another surface to be rested on for operation. In either case, the convenience of a normal flat keyboard can be provided for inputting information.

The embodiments of the invention will now be described by way of example with reference to the accompanying drawings in which:

FIG. 2 is a side view of the bracelet of FIG. 1, when laid out flat;

FIG. 3 is a perspective view of a bracelet embodying the invention, in a form having an alpha numeric keyboard aligned along the length of the bracelet;

FIG. 5 is a plan view of a modification of the bracelet of FIG. 3, in the form of a game station, or electronic game;

FIG. 6 is a plan view of the bracelet of FIG. 5, with an exemplary game display shown on the bracelet;

FIG. 7 is a plan view of the bracelet of FIG. 5, shown with an exemplary display of sports information in place of the game display of FIG. 6;

FIG. 17 shows a perspective view of a further embodiment of the invention in which a bracelet may also operate as a mobile phone, the bracelet being shown in FIG. 17 in a second, flat, configuration;

FIG. 18 is an end view of the bracelet of FIG. 17, positioned in a first, wrist-worn, configuration;

Figure 1:
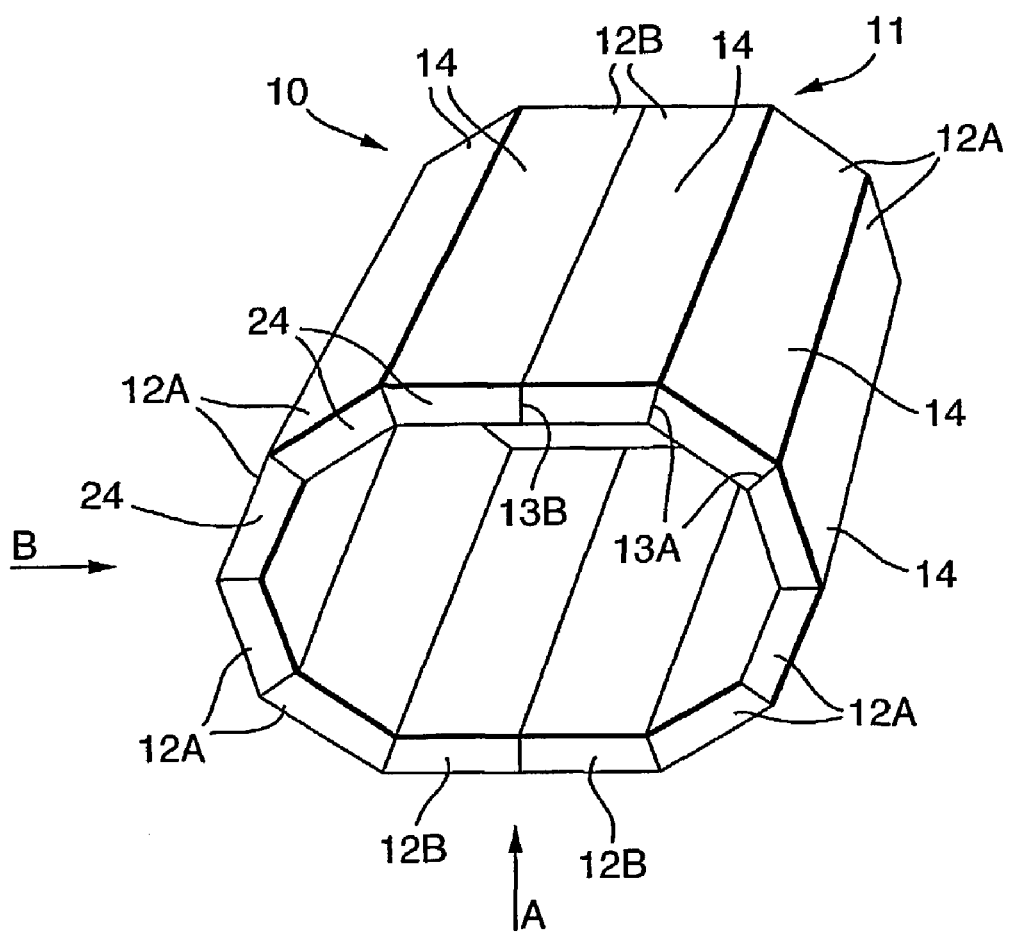
FIG. 1 is a diagrammatic perspective view of the overall form of a bracelet with information display and inputting capability, embodying the present invention.

Referring to FIG. 1, there is shown a bracelet 11 consisting of twelve hinged segments 12A and 12B. Each segment 12A has side faces 13A which are inclined to an outer main face 14 of that segment at an angle of approximately 70°. Each segment 12B has one side face 13A inclined to its main face 14 at an angle of approximately 70°, and also has a side face 13B which is inclined to its main outer face 14 at an angle of 90°. The angles of the side faces 13A and 13B allow the bracelet 11 to be folded into a general oval configuration as shown, allowing comfortable fitting onto the wrist of the user. The actual angles chosen for the faces 13A need not be identical for each face, and will be chosen in order to give the required depth of the oval shape of the bracelet, to conveniently fit the wrist. Each segment 12A, 12B has end faces 24. The segments are hinged together, as will be described in more detail hereinafter, to allow the bracelet to be laid out flat as shown in FIG. 2. Two convenient positions for the ends of the bracelet to be fastened together, are shown at A and B in FIG. 1. The bracelet laid out in FIG. 2 has its junction at position A in FIG. 1. In FIG. 1, point A indicates a junction of the ends of the bracelet at the underside of the wrist of the user, and point B at the side of the wrist of the user. The plurality of segments are hinged together to allow the bracelet to be folded around the wrist of a user.

The bracelet may be secured to the wrist in a number of different ways. For example in FIG. 1 the bracelet may be divided at a position conveniently indicated at A or B, and the divided segments 12B may be joined together by a clasp (not shown). In another arrangement, shown in FIG. 16, the segments of the bracelet do not extend entirely around the wrist, but a small gap is allowed, at the region indicated at C. In such a case, the segments have a coupling between them which provides stiffness in the desired configuration shown in FIG. 16, so that the bracelet is held in place by the action of the coupling between the segments. Of course the bracelet may also be retained by a combination of these forms. For example in FIG. 1 the bracelet may have no clasp between the two ends indicated at the position A. In such an arrangement the bracelet is held in place on the wrist by the stiff coupling between the segments, but is bent until the two free ends abut each other as shown.

Figure 16:
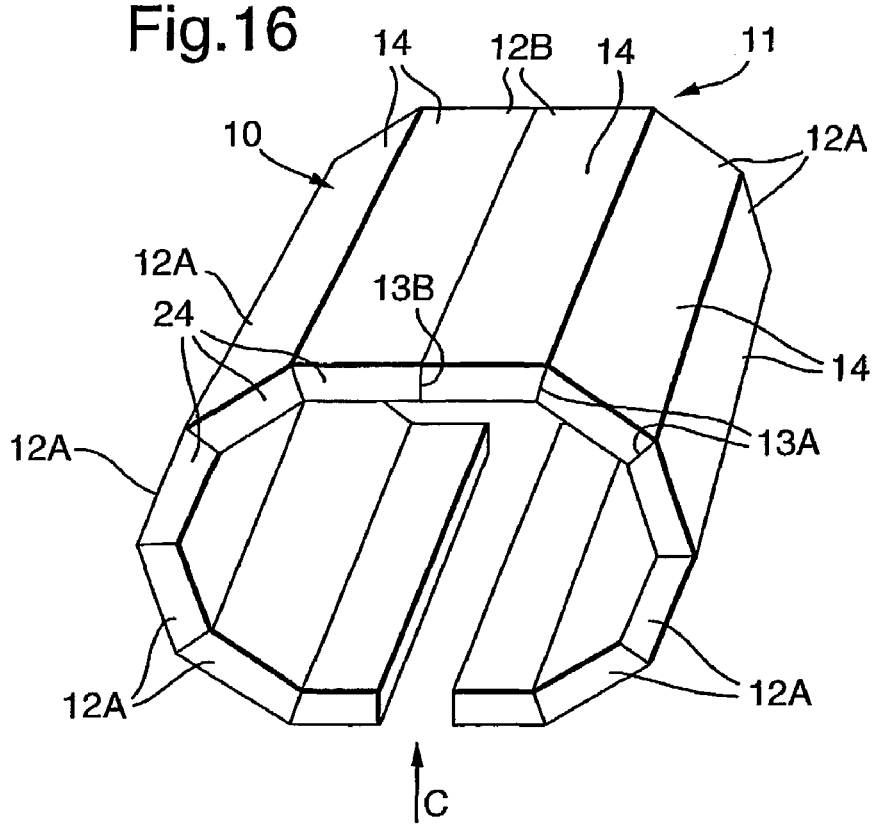
FIG. 16 shows a modification of the embodiment of FIG. 1, in which the bracelet is secured to the wrist by gripping by the action of the segments.

Referring to the embodiment of FIG. 16 by way of example, it is preferred that when worn on the wrist, the segments extend around a path subtending an angle greater than 280°, more preferably subtending an angle greater than 330°. That is to say it is preferred that the gap shown at C subtends an angle at approximately the centre of the wrist, of less than 80°, preferably less than 30°.

Figure 1A:
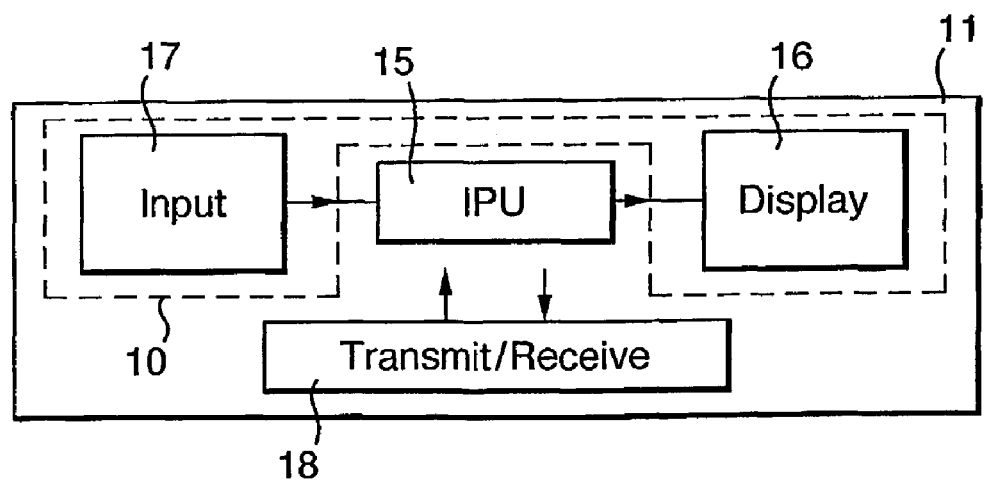
FIG. 1(a) is a block circuit diagram of components mounted in and on the bracelet shown in FIG. 1.
Figure 4:
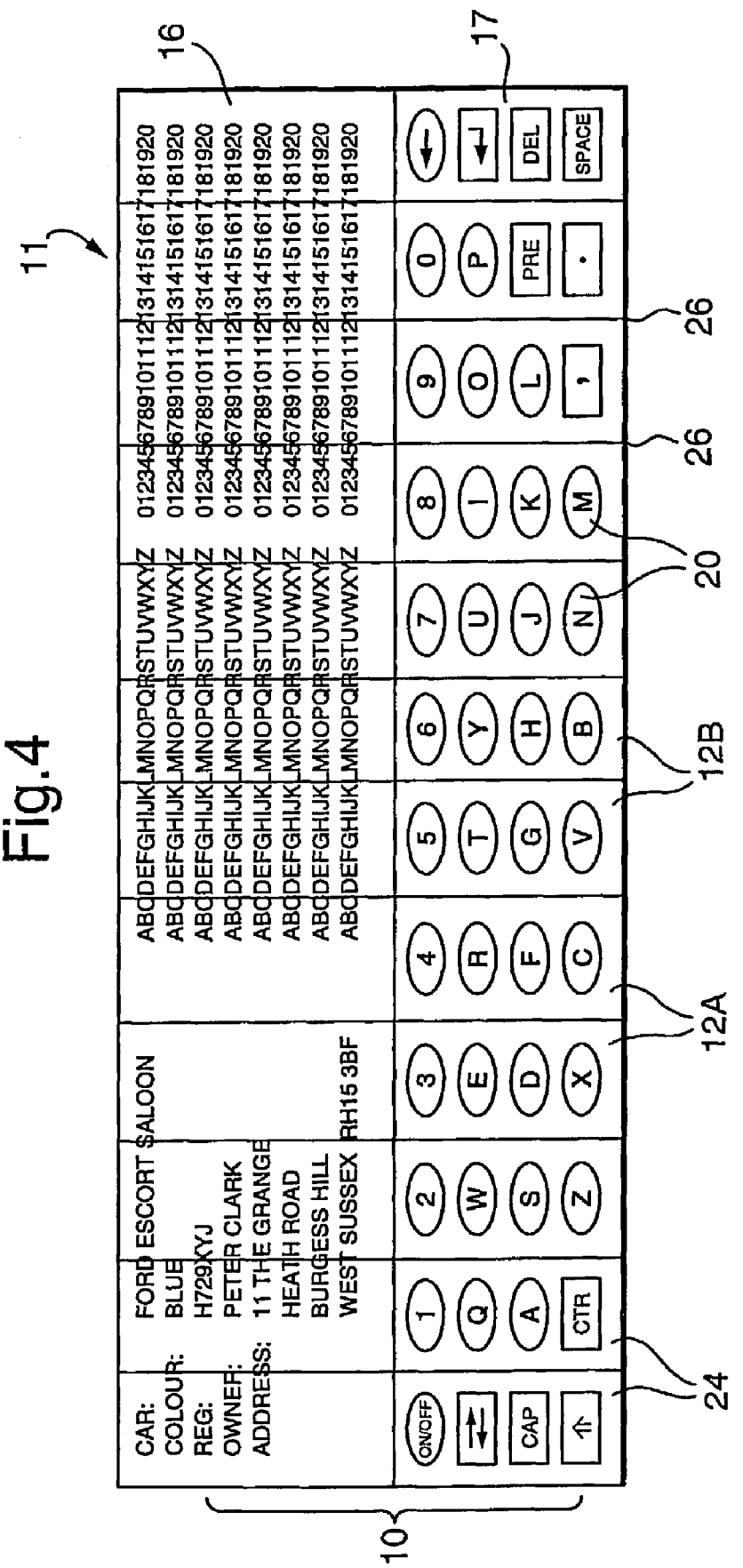
FIG. 4 is a plan view of a bracelet similar to FIG. 3, when laid out flat.
Figure 9:
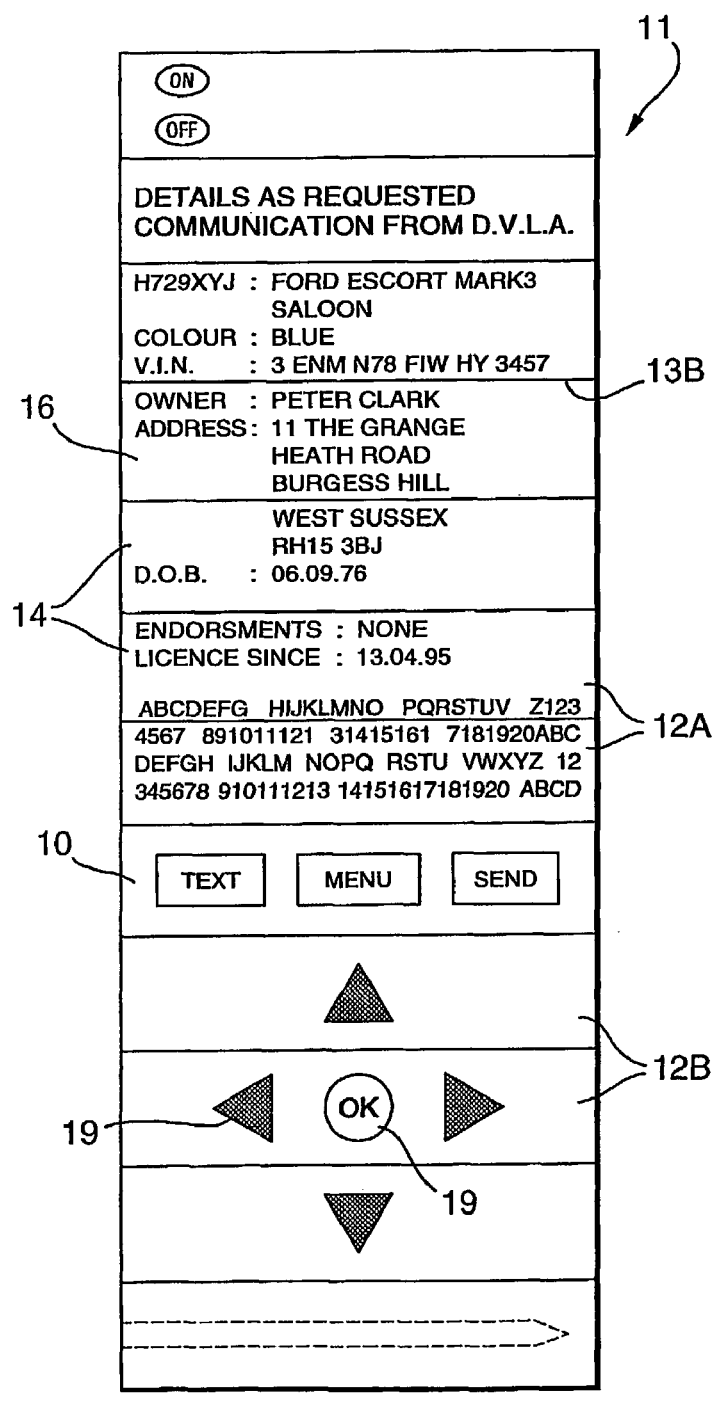
FIG. 9 is a plan view of the bracelet of FIG. 8, when laid out flat, showing a form in which information is inputted through a touch screen with menu selection, in place of an alpha numeric keyboard and, FIG. 9a shows a side view of the bracelet of FIG. 9.
Figure 10:
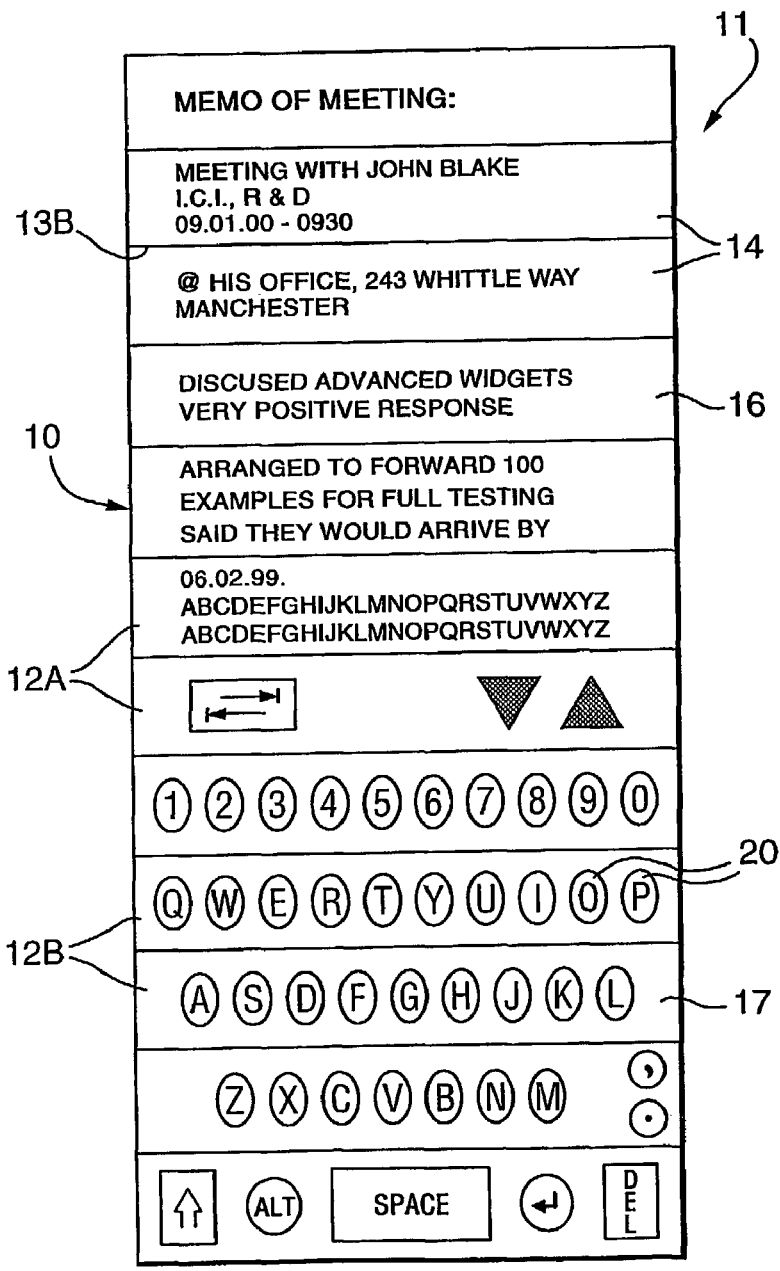
FIG. 10 is a plan view of a bracelet generally of the same form as shown in FIG. 8, where information is displayed in a direction across the length of the bracelet, but where information is inputted through an alpha numeric keyboard, and FIG. 10a being a side view of the bracelet of FIG. 10.
Figure 10A:
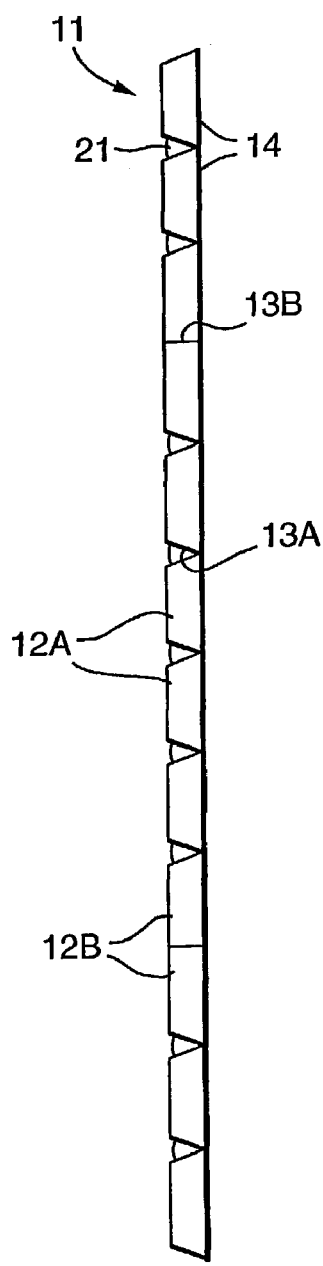

FIG. 1A is a block circuit diagram of electrical components mounted in and on the bracelet. As shown in FIG. 1A, the bracelet 11 comprises an information processing unit 15 for receiving inputted information and for generating display signals, a display device 16 (also referred to as display means), 16 for displaying information derived from the information processing unit 15, and an information inputting device 17 (also referred to as an information inputting means) for inputting information to the information processing unit 15 by manual interaction with the inputting device 17. By way of example, as will be described in more detail hereinafter, the inputting means 17 may consist of an alpha numeric keyboard (as shown in FIGS. 4 and 10), a touch sensitive screen allowing inputting of information by selection from menus (as shown in FIG. 9), or a control device of an electronic game station (as shown in FIGS. 5, 6 and 7). The information processing unit 15 may comprise a processing unit commonly found in electronic organisers, handheld PC's, or electronic game stations. The display device 16 may comprise a display screen made up of LCD segments or light emitting plastics, or other commonly available display screens such as are used in electronic organisers, hand-held PC's, and electronic games.

In accordance with the embodiments of the invention shown, the information inputting means 17 extends over more than one segment 12A, 12B of the bracelet as shown in FIG. 1, and the display means 16 is formed by display screens on the outer faces 14 of the segments, and again extends over more than one segment 12A, 12B of the bracelet 11 in FIG. 1. The information inputting means 17 need not necessarily be independent from the display means 16, but could form part of the display area if, for instance, the information inputting means was part of a touch sensitive screen. For those devices with independent keyboards (as will be described hereinafter) the keys may protrude above the general outer face 14 of a segment, or could be countersunk below the level of the outer face, or could be level with the outer face.

Thus the outer surface of the bracelet 11 has an information exchange area 10 comprising the area occupied by the display device 16 and the area occupied by the inputting device 17 in combination, the information exchange area 10 extending over more than one segment of the bracelet.

As shown in FIG. 1A, the bracelet 11 may also include a transmitter and/or receiver 18 for transmitting and/or receiving information by any of the normally known methods including infra red transmission or conventional telecommunication transmission of information, such as may be used in a pager or mobile telephone.

Although many variations of the present invention may be provided and will be described hereinafter, a number of generally preferred features will now be set out. It is preferred that the display means 16 extends over substantially the entire length of the bracelet 11, and it is also preferred that in the case of bracelets with more than ten segments the information inputting means 17 extends over three or more of the segments 12A, 12B of the bracelet. It is also preferred that the information processing unit 15 is arranged to generate display signals fed to the display means 16 such that when desired information displayed appears to move along the length of the bracelet 11 with time, generally as described in the said published International Patent Application WO 96/21888. Referring now to FIGS. 3 and 4, there is shown one particular form of the bracelet of FIG. 1, in which the information inputting means 17 consists of a QWERTY type keyboard, aligned along the length of the bracelet 11.

As shown in FIGS. 3 and 4, the display means 16 extends over substantially the whole of the length of the bracelet 11, but extends only over approximately half the depth. The information inputting means 17 is formed by a QWERTY type keyboard having keys 20 formed in twelve columns, with each column occupying one of the segments 12A or 12B. The letter keys of the QWERTY keyboard are laid out in ten columns positioned respectively in ten adjacent segments 12A, 12B of the bracelet 11.

FIGS. 3 and 4 show the bracelet 11 in the form of a personal organiser or mini personal computer, the display being such as might appear when the bracelet is worn by a police officer. The display given by way of example is "A.P.B. RED JAGUAR XK8 STOLEN . . . V296ABG . . . TWO OCCUPANTS". Such a message would be arranged to pass around the wrist so that such the message could be seen from any viewing angle. Such a message is shown in FIG. 3.

FIG. 4 shows a bracelet similar to that in FIG. 3, with a different message. Also the bracelet has been unfolded into the flat form, allowing optimum programmability by the QWERTY key pad, and full viewing of the display. In such use, it would be arranged that requests for information would be paged from the bracelet, e.g. a request for details of a suspected stolen car. The required information would then be paged back to the bracelet, or taken from the internet. It will be appreciated that the advantage obtained is that the bracelet, consisting of twelve hinged segments, can be folded around the wrist to allow information to be viewed around the wrist if desired, but at the same time by virtue of the fact that the segments are hinged, the bracelet can be folded out to form a flat working/programming surface, which allows optimum programming.

One particular use for such embodiments is police use. At the moment normally a police officer on the beat or in the car has to rely on a radio for giving and obtaining information. This is inefficient as information needs to be passed through a second party, i.e. the operator. Consequently there are significant time delays, errors, and a limitation as to how much information can be given. Also this information then has to be written done or remembered by the police officer. With an embodiment of the invention, by way of example when a police officer needs to check a suspicious car's registration and owner, the police officer can programme into the mini personal computer bracelet the car's registration number. This request for information can then be paged, or sent via the internet, straight to the vehicle licensing authority. Any required details can then be paged back to the bracelet computer. In such a way large quantities of information can be sent and downloaded. There are no delays by having to pass through the operator, and no chance of the operator misinterpreting or misreading the information.

FIGS. 5, 6 and 7 show modified embodiments. FIG. 5 is a plan view of a modification of the bracelet of FIG. 3, in the form of a game station, or electronic game. FIG. 6 is a plan view of the bracelet of FIG. 5, with an exemplary game display shown on the bracelet. FIG. 7 is a plan view of the bracelet of FIG. 5, shown with an exemplary display of sports information in place of the game display of FIG. 6.

The examples in FIGS. 5, 6 and 7 show the bracelets unfolded. These bracelets have been specifically designed as games stations/platforms, for personal entertainment. FIG. 5 shows the bracelet in basic form with the display screen 16 and buttons or other forms of controls 19 for operating the game. The controls 19 can be independent of the screen 16, or conversely can form part of a touch sensitive screen. If so the controls would not be seen when the bracelet was in another mode other than the "games mode".

FIG. 6 shows the bracelet folded out being used in "games mode" for example in a warfare type of game where text as well as shapes and figures can be displayed. FIG. 7 shows a games bracelet in another mode, i.e. that of a pager, receiving paged information, in this case, sports results and information.

Existing electronic games such as the "Game Boy" are of course rigid and have to be transported in a pocket or bag etc., and hence they can easily be lost, and are not necessarily readily accessible for use. Unfolding bracelet game stations embodying the invention, because they are worn and transported on the wrist, are more readily available and much less likely to be lost. In some embodiment such as those shown in FIGS. 5 to 7, the bracelets have the added advantage of allowing information (text or pictures) to pass around the wrist so that they can be seen from any angle.

As will be appreciated from FIGS. 4 to 7, it is a particularly preferred feature of embodiments of the invention that the display device indicated generally at 16 extends over at least two segments of the bracelet, preferably many segments of the bracelet, and at least some adjacent segments of the display device are visually associated with each other so as to present a unified display of information extending over the associated segments. This is illustrated for example in FIG. 6 where images extend over more than one segment and are combined together to provide a coherent uniform picture for the game. Similarly in FIG. 7, the alpha numeric text is shown as a unified text displayed over several segments.

There are numerous ways in which the displays can be formed, and a normally preferred form is that the display device provides a visual image composed of individually energisable display elements, conveniently pixels as in a television display.

Figure 8:
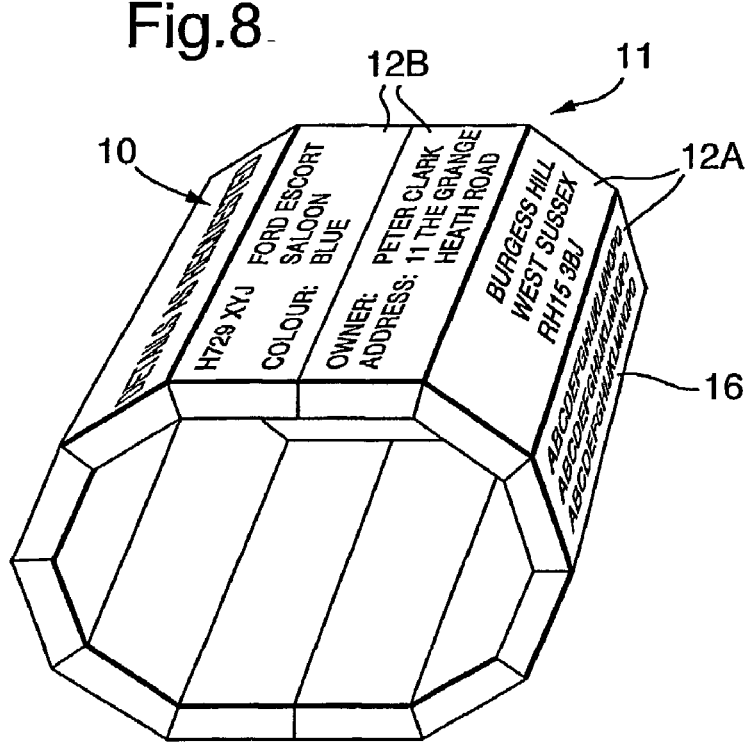
FIG. 8 is a perspective view of a bracelet embodying the invention, corresponding to the view shown in FIG. 1, in the form in which information is displayed in a direction across the length of the bracelet.
Figure 9A:
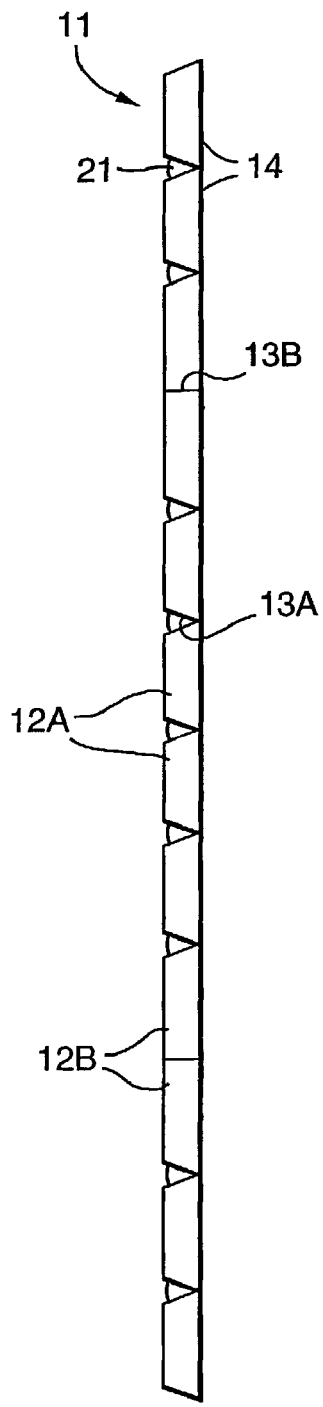

FIG. 8 is a perspective view of a bracelet embodying the invention, corresponding to the view shown in FIG. 1, in the form in which information is displayed in a direction across the length of the bracelet. FIG. 9 is a plan view of the bracelet of FIG. 8, when laid out flat, showing a form in which information is inputted through a touch screen with menu selection, in place of an alpha numeric keyboard, FIG. 9a shows a side view of the bracelet of FIG. 9.

As shown in FIG. 9, the bracelet unfolds to form a "note pad" type of palm top computer. Information is inputted via a stylus 19A. The hand written text is then changed to alpha numeric text by virtue of known hand writing recognition software. The example shown in FIG. 9 is envisaged for police use. The bracelet is worn around the wrist normally, and then unfolded to form the working platform. Information is inputted in the same way as is normally done with a conventional paper pad and pen. However the embodiment gives the advantage of allowing information to be paged to and from the device, as well as allowing information downloaded onto a personal computer when reports or other matters are completed.

For ease of programming, the example shown is configured in such a way that the display screen does not pass along the complete length of the bracelet. Consequently, when the bracelet is worn on the wrist, information cannot circulate entirely around the wrist. The example of FIG. 9 is secured when on the wrist at the region "B" in FIG. 1.

FIG. 9 shows another example where the display device 16 extend over many segments of the bracelet, and the adjacent segments of the display device are visually associated with each other so as to present a unified display of information extending over the associated segments. For example it is seen that the alpha numeric text appears to run consecutively from segment to segment.

FIG. 10 shows a modification of the embodiment of FIG. 9, in the form of a personal organiser/mini personal computer that can be programmed via a QWERTY type key pad 17. This example would also not allow circulating of information around the entire wrist. Again the bracelet is secured at the region B in FIG. 1.

With regard to dimensions, the average circumference of a wrist is approximately 170 mm. Conveniently the bracelet has a cross-sectional depth of approximately 4 or 5 mm. The outer surface length of the bracelet is conveniently approximately 200 mm. The width of the bracelet should not be too great otherwise it will extend too far from the wrist up the forearm. Conveniently the bracelet should have a width of 60 to 70 mm.

Conveniently the bracelet may have twelve hinged segments, as shown in the drawings, which number is chosen to allow the bracelet to have as smooth an appearance as possible when worn on the wrist. However in other embodiments it is possible to provide six, eight, or ten hinged segments, or other number. An even number of segments gives symmetry to the shape, but if necessary, the bracelet could have for example five hinged segments. It is not necessary for all the hinged segments to be of the same size. In fact it may be useful for the segments which go around the side of the wrist to be smaller than the segments which pass over the top and bottom of the wrist.

The segments of the bracelet are hinged to allow movement of the segments between the first, wrist-worn, configuration in which the bracelet is folded around the wrist of a user, and the second, flat, configuration, in which the bracelet is arranged flat by the user for input of information via the inputting device.

Figure 11:
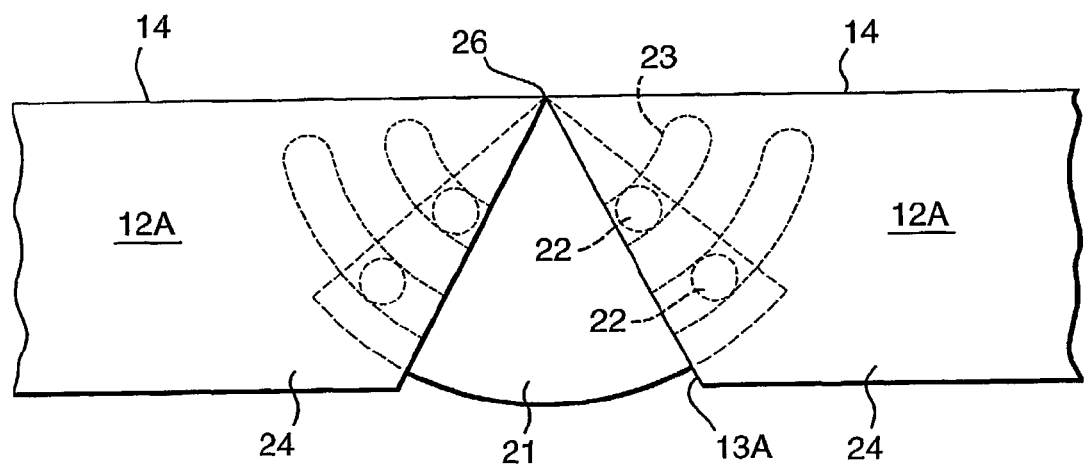
FIG. 11 shows a detailed view of a junction between adjacent segments of the bracelet shown in FIG. 2.
Figure 12:
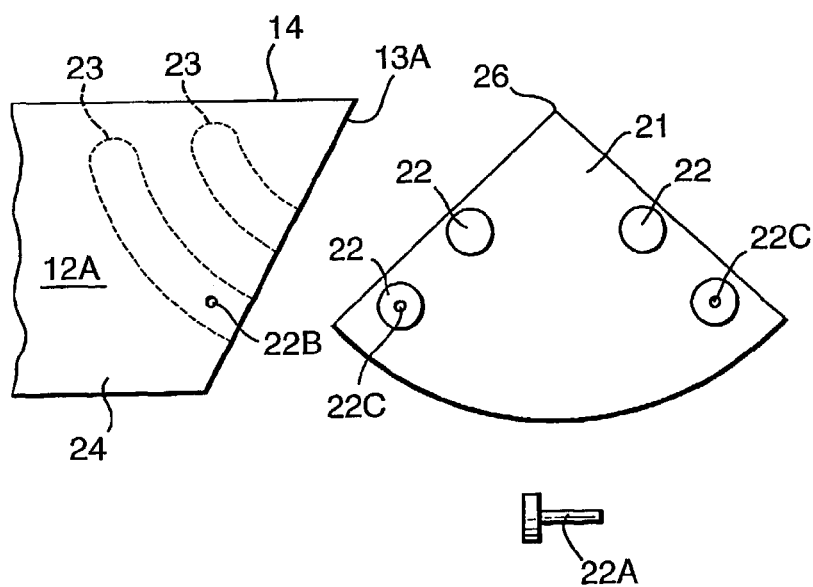
FIG. 12 shows an exploded view of a segment and a link of a bracelet, corresponding to the components of FIG. 11 and, FIG. 12a showing a side view of a junction piece shown in FIG. 12.
Figure 13:
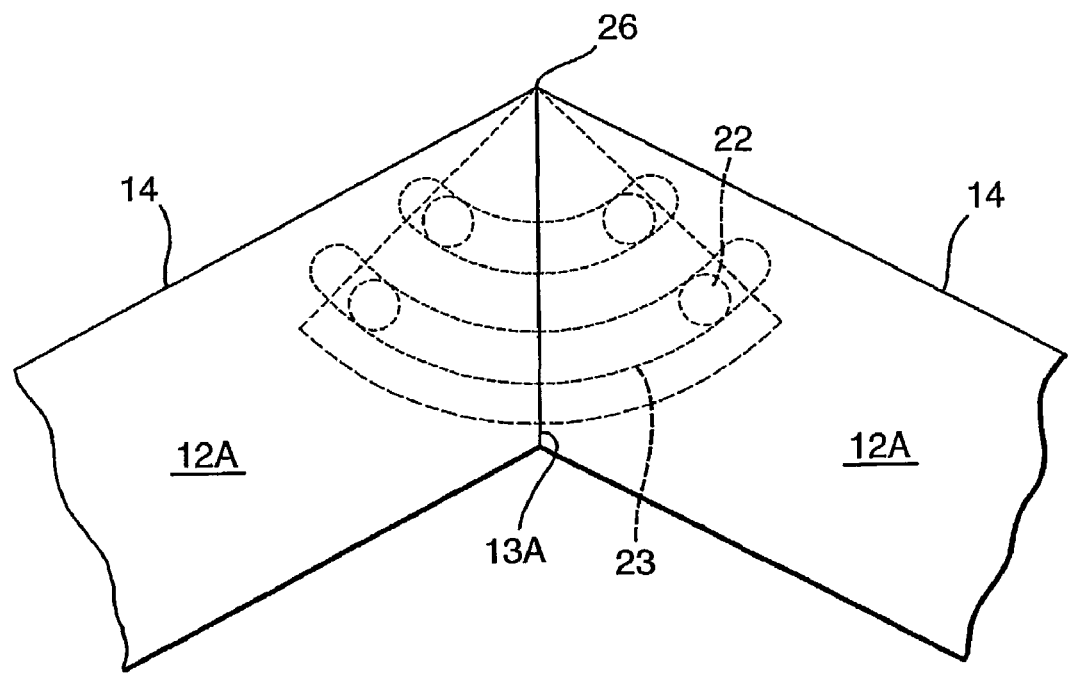
FIG. 13 shows the components of FIG. 11 when adjacent segments of the bracelet are closed together, as when worn by a user.
Figure 14:
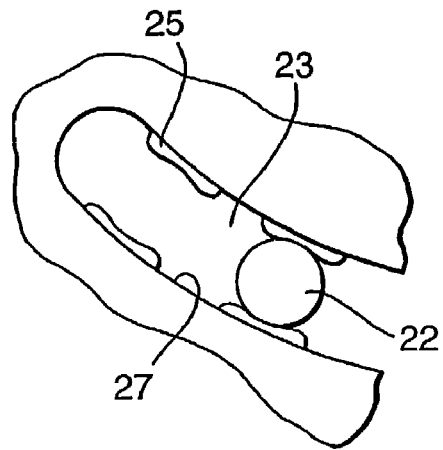
FIGS. 14 and 15 show detailed views of the interaction of fingers and grooves of the segments and junction piece shown in FIG. 11.
Figure 15:
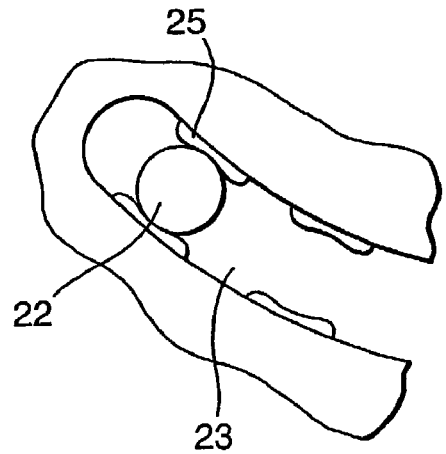

FIG. 11 shows a detailed view of a junction between adjacent segments 12A of the bracelet shown in FIG. 2. FIG. 12 shows an exploded view of a segment 12A and a link 21 of a bracelet, corresponding to the components of FIG. 11. FIG. 13 shows the components of FIG. 11 when adjacent segments of the bracelet are closed together, as when worn by a user. FIGS. 14 and 15 show detailed views of the interaction of fingers and grooves of the segments and junction piece shown in FIG. 11.

Figure 12A:
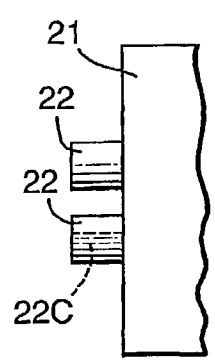

FIG. 11 shows in diagrammatic end view one of the inclined junctions 13A shown in FIG. 1. The two segments 12A are hinged by the link 21 which is a flat plate in the shape of a segment with the point of the segment at a junction 26 of adjacent faces 14 of the segments 12A. As shown in FIGS. 12 and 12a, the link 21 has four studs 22 extending perpendicular to its face, which locate in grooves 23 in the underside of the end faces 24 of the segments 12A. The grooves 23 are part circular, lying on circles centred on the junction 26 between adjacent faces 14 of the segments 12A. As shown in FIGS. 11 and 13, pivoting of the segments 12A about the axis 26 is achieved by the studs 22 moving along the grooves 23. This arrangement gives the advantage that the outer faces 14 abut both in the fold flat condition and when the bracelet is worn on the wrist, thus allowing a continuous display surface from the bracelet.

The arrangement shown in FIG. 11 may be modified so as to provide that adjacent segments 12A are completely fixed relative to each other when in the flat configuration. By way of example the bracelet may include between adjacent segments 12A a catch (not shown) which can be manually operated to lock the segments in a completely fixed relationship preventing movement. In another arrangement, shown in FIG. 12, a pin 22A can be inserted through a hole 22B in the end face 24 of a segment 12A into a hole 22C in a stud 22 to fix the segments.

However, as has been mentioned such a locking pin is a modification. In other arrangements the studs and grooves may provide stiffness to the bracelet merely by friction.

As shown in FIGS. 14 and 15, in another arrangement there may be provided on inner guide surfaces 27 of each groove 23 detent protrusions 25 into which the studs 22 can be located, so as to give a rigidly fixed fold flat position, and a rigidly fixed position for wearing the bracelet on the wrist. Thus the components 22 and 25 provide a locking mechanism operating between a pair of adjacent segments of the bracelet to releasably lock the adjacent segments into a fixed relationship when in the said laid-flat position. In the laid flat position the detent mechanism resiliently biases the adjacent segments to the said flat, fixed relationship but allows release for folding around the wrist, by manual movement against the resilient biasing. Thus in the embodiment which has been described, the bracelet includes coupling components for coupling the segments together in such a manner as to maintain the bracelet substantially fixed in the flat configuration during normal inputting of information.

By way of example, the stiffness provided by the detent mechanism which has been described may be chosen so that in the flat configuration the bracelet is sufficiently rigid to prevent movement of the segments relative to each other when held in a cantilevered position by holding one third of the bracelet.

It is not essential that distinct detent mechanisms are provided in order to give the required stiffness. In some arrangements the hinges provided between segments may merely be stiff hinges, which provide uniform stiffness in different configurations. The user will then bend the bracelet to the required position, whether it be the first wrist worn configuration, or the second, flat, configuration. Provided the stiffness is chosen correctly, the bracelet can perform the functions described on the wrist or when held cantilevered in the flat configuration.

It is not essential that the bracelet has a rigidly fixed position for wearing the bracelet on the wrist. In some arrangements there may be provided locking means for locking at least some segments in the flat position, while leaving the segments freely hinged when worn on the wrist.

The feature of the abutting outer faces 14 allows moving information that is displayed when the bracelet is worn on the wrist, to appear to move seamlessly around the wrist, i.e. that the information will not appear to jump from one hinged segment to another. Equally it prevents clothing snagging at the inner edges of the inclined faces 13A.

A further embodiment of the invention will now be described in which the bracelet may serve also as a mobile telephone. FIGS. 17 to 21 show a bracelet embodying the invention in which one segment 12S forms a telephone ear piece and another segment 12M forms a telephone mouth piece. As shown in FIG. 1A, there is also provided a transmitter and receiver 18 to allow the bracelet to function as a mobile telephone. In general, where components in FIGS. 17 to 22 correspond to components in previous figures, the components are indicated by like reference numerals.

Figure 19:
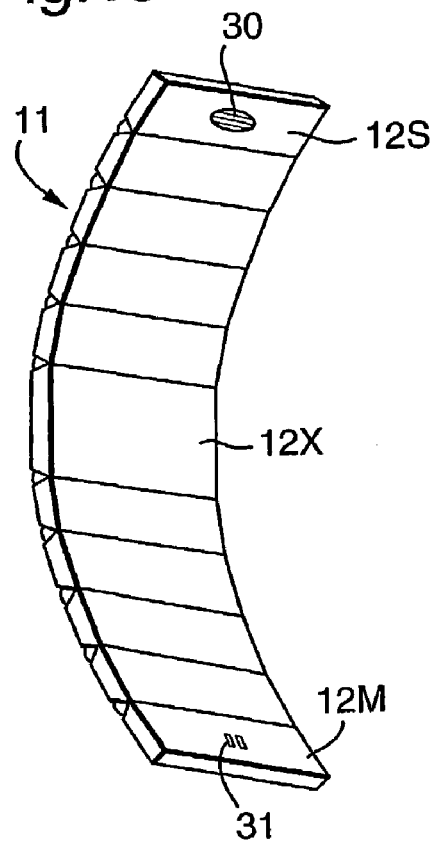
FIG. 19 is a perspective view of the bracelet of FIGS. 17 and 18, positioned in a third, telephone, configuration.
Figure 20:
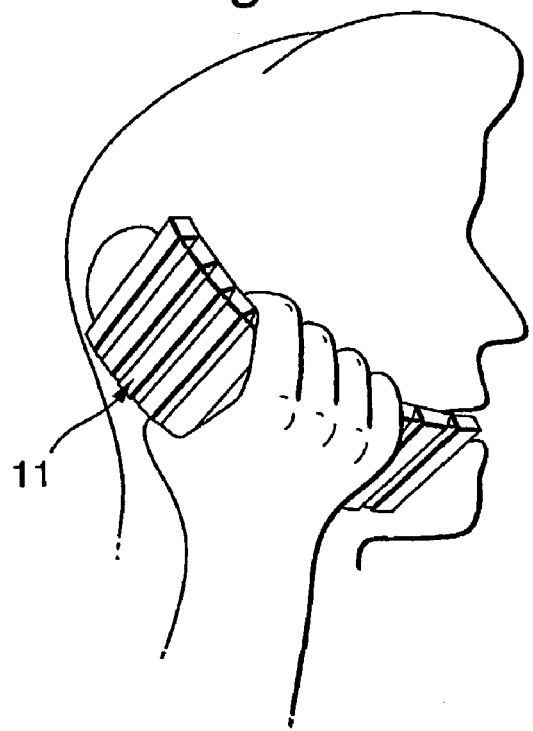
FIG. 20 shows the bracelet of FIG. 19 in the third, telephone, configuration, when in use.

As shown in FIG. 19, the segments 12 of the bracelet 11 are hinged to allow movement of the bracelet to a third, telephone, configuration, in which the telephone ear piece 12S and telephone mouth piece 12M can be positioned in a normal telephone operating position relative to the ear and mouth of a user, as shown in FIG. 20. As shown in FIG. 19, in the third telephone configuration, the bracelet 11 is shaped in a curved configuration. In other arrangements, a central part of the bracelet may be maintained in the flat configuration, with only the two ends of the bracelet being in inclined relationship.

Considering now the details of the embodiment, FIG. 17 shows an eleven segment bracelet 11 folded out into a flat working platform, i.e. the second, flat, configuration. This is the configuration of the bracelet most suited to alpha numeric and diagrammatic data input, and most suited to visual data and image recognition. The illustrated bracelet includes, at one end a speaker 30 in the ear piece 12S for amplifying audio signals received to the bracelet. At the other end of the bracelet, there is a microphone 31 in the mouth piece 12M to pick up and convert voice signals into digital data. The microphone and speaker 31 and 30 are placed on the side of the bracelet which in the flat configuration is the top side of the bracelet, that is to say the side upon which the display and inputting devices 16, 17 are sited. This side of the bracelet is the outer side when the bracelet is in the first, wrist-worn, configuration. Preferably the microphone and speaker are not positioned on the underside, or inner side, of the bracelet, as they would touch the skin of the wrist. This contact with the skin would have the effect of muting or muffling the speaker when the bracelet is worn around the wrist. However, although the arrangement of putting the speaker and microphone on the top or outer side of the bracelet is preferred, there is a mechanical advantage in placing them on the underside of the bracelet, in that the hinge arrangement required would not be so complex.

FIG. 18 shows the eleven segment bracelet, in end view, as if worn and connected around the wrist. The bracelet could be secured at various points around the wrist, but the preferred arrangement is a junction at either point A, or point B, as has been discussed with reference to the embodiment of FIG. 1. A particularly convenient arrangement is with the junction at position A, since in the present embodiment the central segment 12X, is larger than the other segments. It is to be noted that such an arrangement may be used in all the other embodiments which have been described, since it is often preferable to have a larger segment in the position opposite to the junction A in FIG. 18. This is the position normally occupied by a wrist watch, and gives a particularly convenient large central region of the information exchange area, on the top of the wrist when in the wrist-worn position.

FIG. 18 shows the relative positions of the speaker 30 and microphone 31 when the bracelet 11 is worn around the wrist, i.e. they would be occupying adjacent segments. If the bracelet were to be secured at position B, or any other point, the configuration would have to be amended to position the speaker and the microphone appropriately, for example preferably so as to provide the speaker and the microphone always on adjacent segments on either side of the joining point.

FIG. 19 shows a side view of the bracelet 11 of FIGS. 17 and 18, which has been manipulated into a "C" shape. The "C" shape is arrived at by first removing the bracelet from the wrist, and then effectively bending it back upon itself. To achieve this the user does not have to first arrange the bracelet in a perfect flat form. However, the finalised "C" shape is effectively a further bending onwards from the flat folded out form.

It is to be noted that in an alternative form (not shown) in which the microphone and speaker are positioned on the underside of the bracelet, the "C" shape of FIG. 19 can be arrived at more quickly and easily. This is because the "C" shape required when the microphone and speaker are cited on the underside of the bracelet, it is effectively a half way position between the folded bracelet form around the wrist, and the flat form of the bracelet. In such a case the "C" shape is an intermediate shape which is obtained after taking the bracelet off the wrist, but before it is fully folded out into a flat shape.

FIG. 20 shows the bracelet of FIGS. 17, 18 and 19 being held to the face of the user when in use as a mobile telephone. The microphone 31 and speaker 30 are again positioned on the outer or top side of the bracelet, i.e. on the side occupied by the display device and inputting device.

Figure 21:
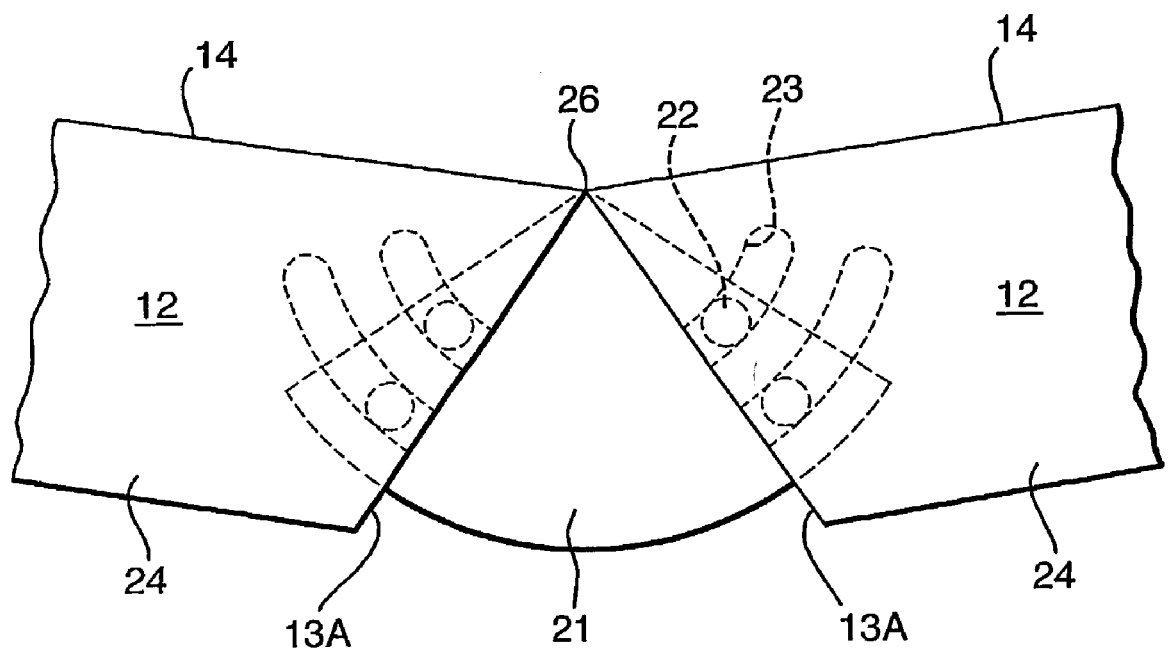
FIG. 21 shows a detailed view of a junction between adjacent segments of the bracelet shown in FIGS. 17 to 19.

FIG. 21 shows a three-positional hinge arrangement corresponding to the components of FIG. 11, modified so as to allow the "C" shape configuration of FIGS. 18 and 19 to be achieved. Two segments 12 are shown that have been bent back towards one another so as to form the preferred "C" shape of FIG. 19. The hinge of FIG. 21 differs from the hinges shown in FIGS. 14 and 15, in that there are now three sets of detent protrusions (shown in FIG. 22). One set is applicable to allow a rigid, wrist-worn configuration. A second set facilitates the flat folded out configuration. A third set facilitates the "C" shape form.

It is to be noted that three sets of detent provisions are not essential, even for a bracelet which can be locked into the "C" shape for the telephone configuration. This is because there is no real need for the bracelet to be locked into the first, wrist-worn configuration so long as there is provision for securing the two ends of the bracelet together. The bracelet can then be worn in a conventional, freely hinged, configuration around the wrist, being secured by a clasp. This has the advantage of making it easier and quicker to remove the bracelet from the wrist before it is locked into the second, flat, configuration, or into the third, telephone, configuration. This feature of having a loosely hinged configuration when worn on the wrist, is also applicable in the other embodiments which have been described, without the third telephone configuration.

Figure 22:
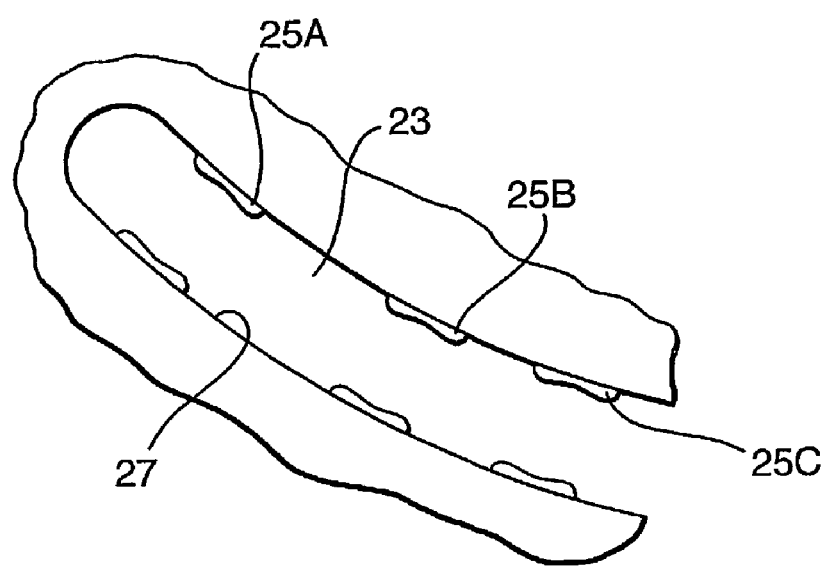
FIGS. 22 show detailed views of the interaction of studs and grooves of the segments and junction pieces shown in FIG. 21.

Considering now the detail of the detent arrangements, FIG. 22 shows three sets of detent protrusions 25A, 25B and 25C. The lower third set enables the "C" shape of telephone configuration to be achieved, when the microphone 31 and speaker 30 are placed on the top or outer side of the bracelet along with the display and inputting devices. The first and uppermost of detent protrusions 25A facilitate the natural form of the bracelet when worn around the wrist. In the wrist-worn configuration, the segment faces 13A are as close as possible to one another. The second set of detent protrusions 25B relate to the next configuration, i.e. the second, flat, folded out configuration. The third and final set of detent protrusions 25C relate to the third, telephone configuration. In this latter configuration, the segment side faces 13A are at their furthest from one another. Correspondingly, the upper or outer faces 14 of the segments, are at their closest, being bent back towards one another.

The invention claimed is:

1. A bracelet with information display and inputting capability, comprising:
   a plurality of four or more segments hinged together to allow the bracelet to be folded around the wrist of a user;
   an information processing unit for receiving inputted information and for generating display signals for displaying information;
   a display device for displaying information derived from the information processing unit; and
   an information inputting device for inputting information to the information processing unit by manual interaction with the inputting device;
   the outer surface of the bracelet having an information exchange area comprising the area occupied by the display device and the area occupied by the inputting device in combination, the information exchange area extending over more than one segment of the bracelet,
   the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device,
   in which the bracelet includes coupling components for coupling the segments together in such a manner as to maintain the bracelet at least substantially fixed in the flat configuration during normal inputting of information.

2. A bracelet according to claim 1 in which the bracelet is arranged to be secured to the wrist by virtue of encircling the wrist completely in the first configuration.

3. A bracelet according to claim 1, in which the bracelet is arranged to be secured to the wrist by gripping the wrist by the action of the segments.

4. A bracelet according to claim 3, in which in the first configuration the segments extend around a path subtending an angle greater than 280°.

5. A bracelet according to claim 3, in which in the first configuration the segments extend around a path subtending an angle greater than 330°.

6. A bracelet according to claim 1 in which the bracelet comprises at least five segments.

7. A bracelet according to claim 1, in which the bracelet comprises at least seven segments.

8. A bracelet according to claim 1, in which the bracelet comprises eleven segments.

9. A bracelet according to claim 1, in which the coupling components comprise stiff hinges having sufficient stiffness to maintain the bracelet substantially fixed in the flat configuration during normal inputting of information.

10. A bracelet according to claim 9, in which the coupling components provide a greater extent of stiffness when the bracelet is in the second, flat, configuration, than when the bracelet is in the first, wrist-worn, configuration.

11. A bracelet according to claim 9, in which the coupling components have an extent of stiffness which is substantially the same when the bracelet is in the second flat configuration and in the first wrist-worn configuration, the extent of stiffness being selected such as to maintain the bracelet substantially fixed in the flat configuration during normal inputting of information, yet sufficiently movable to allow movement of the bracelet to the first wrist-worn configuration.

12. A bracelet according to claim 1, in which the coupling components include at least one locking mechanism operating between a pair of adjacent segments of the bracelet to releasably lock the adjacent segments into an at least substantially fixed relationship when in the said second flat position.

13. A bracelet according to claim 12, in which the locking mechanism is a detent mechanism which, in the second, flat, position, resiliently biases adjacent segments to the said fixed relationship but allows release for folding around the wrist, by manual movement against the resilient biasing.

14. A bracelet according to claim 1, in which in the flat configuration the bracelet is sufficiently rigid to prevent movement of the segments relative to each other when held in a cantilevered position by holding one third of the bracelet.

15. A bracelet according to claim 1, wherein adjacent segments of the bracelet have outer faces which substantially abut each other both when the bracelet is bent about the wrist of a user and when in the flat configuration, adjacent segments being hinged for pivotal movement about the line of abutment of adjacent outer faces of the adjacent segments.

16. A bracelet according to claim 1, in which the length of the bracelet is formed entirely by the segments.

17. A bracelet according to claim 1, wherein the information exchange area extends over at least 50% of the normally visible outer surface of the bracelet when in the first, wrist-worn position.

18. A bracelet according to claim 17, wherein the information exchange area extends over at least 75% of the normally visible outer surface of the bracelet when in the first, wrist-worn position.

19. A bracelet according to claim 18, wherein the information exchange area extends over substantially the whole of the normally visible outer surface of the bracelet when in the first wrist-worn position.

20. A bracelet according to claim 1, in which the display device extends over two or more segments of the bracelet, and is arranged to provide a visual image composed of individually energisable display elements.

21. A bracelet according to claim 1, in which the display device extends over at least two segments of the bracelet, at least some adjacent segments of the display device being visually associated with, each other so as to present a unified display of information extending over the associated segments.

22. A bracelet according to claim 1, wherein the display device extends over three or more segments of the bracelet.

23. A bracelet according to claim 22, wherein the display device extends over substantially the entire length of the bracelet.

24. A bracelet according to claim 1, wherein the information inputting device extends over three or more segments of the bracelet.

25. A bracelet according to claim 24, wherein the information inputting device extends over substantially the entire length of the bracelet.

26. A bracelet according to claim 1, wherein the information inputting device comprises an alpha-numeric keyboard.

27. A bracelet according to claim 26, wherein the keyboard is aligned along or across the length of the bracelet.

28. A bracelet according to claim 27, wherein the keyboard has a plurality of columns of keys, one or more columns being positioned on adjacent segments of the bracelet.

29. A bracelet according to claim 28, wherein the keyboard is a QWERTY type keyboard, the letter keys being laid out in ten columns, one or more columns being positioned on adjacent segments of the bracelet.

30. A bracelet according to claim 28, wherein at least some of the columns are positioned respectively on adjacent segments of the bracelet.

31. A bracelet according to claim 26, wherein the keyboard occupies only part of the width of the bracelet, the remainder of the width being occupied by the display device.

32. A bracelet according to claim 26, wherein the keyboard has a plurality of rows of keys, one or more rows being positioned on adjacent segments of the bracelet.

33. A bracelet according to claim 32, wherein the keyboard is a QWERTY type keyboard, the letter keys being laid out in three rows, one or more rows being positioned on adjacent segments of the bracelet.

34. A bracelet according to claim 32, wherein at least some of the rows are positioned respectively on adjacent segments of the bracelet.

35. A bracelet according to claim 1, wherein the information inputting means comprises a touch sensitive screen allowing inputting of information.

36. A bracelet according to claim 35, wherein about ⅔ of the bracelet is unsupported in the flat configuration, yet the bracelet remains substantially rigid.

37. A bracelet according to claim 1, wherein the information processing means comprises a control means for an electronic game.

38. A bracelet according to claim 1, wherein the information processing unit is arranged to generate display signals such that information displayed appears to move along the length of the bracelet with time.

39. A bracelet according to claim 1, in which the information exchange area has a width in a direction transverse to the length of the bracelet which is at least 10% of the length of the bracelet.

40. A bracelet according to claim 39, in which the information exchange area has a width in a direction transverse to the length of the bracelet which is at least 20% of the length of the bracelet.

41. A bracelet according to claim 40, in which the information exchange area has a width in a direction transverse to the length of the bracelet which is at least 30% of the length of the bracelet.

42. A bracelet according to claim 41, in which the information exchange area has a width in a direction transverse to the length of the bracelet which is at least 40% of the length of the bracelet.

43. A bracelet according to claim 42, in which the information exchange area has a width in a direction transverse to the length of the bracelet which is at least 50% of the length of the bracelet.

44. A bracelet according to claim 1, in which the information exchange area is elongate in a direction along the length of the bracelet.

45. A bracelet according to claim 44, in which the information exchange area is substantially rectangular.

46. A bracelet according to claim 1, in which the minimum width of the bracelet in a direction transverse to the length of the bracelet is equal to at least 10% of the length of the bracelet.

47. A bracelet according to claim 46, in which the minimum width of the bracelet in a direction transverse to the length of the bracelet is equal to at least 20% of the length of the bracelet.

48. A bracelet according to claim 1, in which the average width of the bracelet in a direction transverse to the length of the bracelet is equal to at least 10% of the length of the bracelet.

49. A bracelet according to any of claim 48, in which the average width of the bracelet in a direction transverse to the length of the bracelet is equal to at least 20% of the length of the bracelet.

50. A bracelet according to claim 1, in which the width of the bracelet in a direction transverse to the length of the bracelet is substantially constant.

51. A bracelet according to claim 1, in which the information exchange area is elongate in the direction of the length of the bracelet, and the information inputting device comprises an array of manually operable key regions representing respectively the letters of an alphabet, the array of key regions being aligned across or along the length of the bracelet.

52. A bracelet according to claim 1, in which one segment of the bracelet has a telephone ear piece and another segment of the bracelet has a telephone mouth piece and the information processing unit includes a telephone transmitter and telephone receiver, and in which the segments of the bracelet are hinged to allow movement to a third, telephone, configuration, in which the telephone ear piece and the telephone mouth piece are positioned in a normal telephone operating position relative to the ear and mouth of a user.

53. A bracelet according to claim 52, in which in the third telephone configuration the bracelet is shaped in an at least partly curved configuration having an overall curvature less than the curvature in the first wrist-worn configuration.

54. A bracelet according to claim 1, wherein, in the flat configuration, the bracelet is sufficiently rigid to prevent movement of the segments relative to one another.

55. A bracelet according to claim 54, wherein, in the flat configuration, the bracelet is sufficiently rigid to prevent movement of the segments relative to one another when held in cantilever fashion.

56. A bracelet with information display and inputting capability, comprising:

a plurality of four or more segments hinged together to allow the bracelet to be folded around the wrist of a user;

an information processing unit for receiving inputted information and for generating display signals for displaying information; a display device for displaying information derived from the information processing unit; and an information inputting device for inputting information to the information processing unit by manual interaction with the inputting device;

the outer surface of the bracelet having an information exchange area comprising the area occupied by the display device and the area occupied by the inputting device in combination, the information exchange area extending over more than one segment of the bracelet, the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device, in which the information exchange area is elongate in the direction of the length of the bracelet, and the information inputting device comprises an array of manually operable key regions representing respectively the letters of an alphabet, the array of key regions being aligned along or across the length of the bracelet.

57. A bracelet with information display and inputting capability, comprising:

a plurality of five or more segments hinged together to allow the bracelet to be folded around the wrist of a user;

an information processing unit for receiving inputted information and for generating display signals for displaying information;

a display device for displaying information derived from the information processing unit; and an information inputting device for inputting information to the information processing unit by manual interaction with the inputting device;

the outer surface of the bracelet having an information exchange area comprising the area occupied by the display device and the area occupied by the inputting device in combination, the information exchange area extending over more than one segment of the bracelet;

the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device;

in which the display device extends over at least three segments of the bracelet, and the information inputting device also extends over at least three segments of the bracelet;

in which the information exchange area is elongate in a direction along the length of the bracelet, and the information exchange area extends over at least 50% of the normally visible outer surface of the bracelet has a width in a direction transverse to the length of the bracelet which is at least 30% of the length of the bracelet; and in which the bracelet includes coupling components for coupling the segments together in such a manner as to maintain the bracelet at least substantially fixed in the flat configuration during normal inputting of information.

58. A bracelet with information display and inputting capability, comprising:

a plurality of five or more segments hinged together to allow the bracelet to be folded around the wrist of a user;

an information processing unit for receiving inputted information and for generating display signals for displaying information;

a display device for displaying information derived from the information processing unit; and an information inputting device for inputting information to the information processing unit by manual interaction with the inputting device;

the outer surface of the bracelet having an information exchange area comprising the area occupied by the display device and the area occupied by the inputting device in combination, the segments of the bracelet being hinged to allow movement of the segments between a first, wrist-worn, configuration in which the bracelet can be folded around the wrist of a user, and a second, flat, configuration, in which the bracelet can be arranged flat by the user for input of information via the inputting device, in which the bracelet includes coupling components for coupling the segments together in such a manner as to maintain the bracelet at least substantially fixed in the flat configuration during normal inputting of information, and in which in the first configuration the segments extend around a path subtending an angle greater 280°;

in which the information exchange area extends over at least 50% of the normally visible outer surface of the bracelet when in the first, wrist-worn position.

59. A method of operating a bracelet with information display and inputting capability, comprising:

inputting information to an information processing unit mounted in a bracelet, by manual interaction with an inputting device mounted on the bracelet, the outer surface of the bracelet having an information exchange area comprising the area occupied by the display device and the area occupied by the inputting device in combination, the information exchange area extending over more than one segment of the bracelet; and displaying information derived from the information processing unit, on a display device on the bracelet, while the bracelet is worn on the wrist of a user, the bracelet comprising a plurality of segments hinged and coupled together to allow the bracelet to be folded around the wrist of a user;

the method including the steps of:
  displaying information on the display device while the bracelet is worn on the wrist of a user; and
  inputting information into the information processing unit when the bracelet is arranged flat by the user, by manual interaction with the information inputting device.

60. A method according to claim 59 including positioning the bracelet in the second, flat, configuration, in front of the user in a transverse orientation with the length of the bracelet extending across the field of view of the user, and inputting information by manual interaction with the inputting device in the said transverse orientation.

61. A method according to claim 59 including the steps of removing the bracelet from the wrist and moving the segments of the bracelet to a flat configuration in which the segments are maintained at least substantially fixed relative to each other, and
  inputting information via the inputting device while holding the bracelet by only a portion of the length of the bracelet, the remainder of the bracelet being maintained at least substantially fixed in the flat configuration.

62. A method according to claim 59, in which the display device extends over at least two segments, and the method includes moving at least two adjacent segments of the display device to a flat configuration in which the segments are visually associated with each other so as to present a unified display of information extending over the visually associated segments.

63. A method of operating a bracelet with information display and inputting capability, comprising:
  inputting information to an information processing unit mounted in a bracelet, by manual interaction with an inputting device mounted on the bracelet; and
  displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user;
  the method including the steps of:
    displaying information on the display device while the bracelet is worn on the wrist of a user, and inputting information into the information processing unit when the bracelet is arranged flat by the user, by manual interaction with the information inputting device, the area occupied by the display device and the inputting device in combination extending over more than one segment of the bracelet;
    wherein the method includes positioning the bracelet in the second flat, configuration, in front of the user in a transverse orientation with the length of the bracelet extending across the field of view of the user, and inputting information by manual interaction with the inputting device in the said transverse orientation.

64. A method of operating a bracelet with information display and inputting capability, comprising:
  inputting information to an information processing unit mounted in a bracelet, by manual interaction with an inputting device mounted on the bracelet; and
  displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user;
  the method including the steps of:
    displaying information on the display device while the bracelet is worn on the wrist of a user; and inputting information into the information processing unit when the bracelet is arranged flat by the user, by manual interaction with the information inputting device, the area occupied by the display device and the inputting device in combination extending over more than one segment of the bracelet;
    in which the steps of removing the bracelet from the wrist and moving the segments of the bracelet to a flat configuration in which the segments are maintained at least substantially fixed relative to each other, and
    inputting information via the inputting device while holding the bracelet by only a portion of the length of the bracelet, the remainder of the bracelet being maintained at least substantially fixed in the flat configuration.

65. A method of operating a bracelet with information display and inputting capability, comprising:
  inputting information to an information processing unit mounted in a bracelet, by manual interaction with an inputting device mounted on the bracelet; and
  displaying information derived from the information processing unit, on a display device mounted on the bracelet, while the bracelet is worn on the wrist of a user, the bracelet comprising a plurality of segments hinged together to allow the bracelet to be folded around the wrist of a user or to be arranged flat by the user;
  the method including the steps of:
    displaying information on the display device while the bracelet is worn on the wrist of a user; and inputting information into the information processing unit when the bracelet is arranged flat by the user, by manual interaction with the information inputting device, the area occupied by the display device and the inputting device in combination extending over more than one segment of the bracelet;
    in which the display device extends over at least two segments, and the method includes moving at least two adjacent segments of the display device to a flat configuration in which the segments are visually associated with each other so as to present a unified display of information extending over the visually associated segments.

* * * * *